US012637832B2

(12) United States Patent
Masuda

(10) Patent No.: US 12,637,832 B2
(45) Date of Patent: May 26, 2026

(54) WORKING MACHINE

(71) Applicant: KUBOTA CORPORATION, Osaka (JP)

(72) Inventor: Ryohei Masuda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 330 days.

(21) Appl. No.: 18/542,936

(22) Filed: Dec. 18, 2023

(65) Prior Publication Data

US 2024/0125087 A1      Apr. 18, 2024

Related U.S. Application Data

(63) Continuation of application No. PCT/JP2022/015145, filed on Mar. 28, 2022.

(30) Foreign Application Priority Data

Jun. 30, 2021   (JP) ................................. 2021-109152
Jun. 30, 2021   (JP) ................................. 2021-109153
Jun. 30, 2021   (JP) ................................. 2021-109154

(51) Int. Cl.
  *E02F 9/08*        (2006.01)
  *B60H 1/00*        (2006.01)
      (Continued)

(52) U.S. Cl.
  CPC ....... *E02F 9/0858* (2013.01); *B60H 1/00378* (2013.01); *E02F 9/0891* (2013.01); *E02F 9/16* (2013.01); *E02F 9/267* (2013.01)

(58) Field of Classification Search
  CPC ......... E02F 9/0858; E02F 9/0891; E02F 9/16; B62D 33/0617; B60H 1/00378; B60K 11/04; F01P 11/10
  See application file for complete search history.

(56) References Cited

U.S. PATENT DOCUMENTS 7,874,391 B2 *   1/2011   Dahl ...................... B60K 11/04
                                                       280/783
12,508,895 B2 *  12/2025  Gilge ..................... B60K 11/04
                    (Continued)

FOREIGN PATENT DOCUMENTS

CN        108045196 A  *  5/2018   ............... B60H 1/30
JP        1993054015 U     7/1993
                    (Continued)

OTHER PUBLICATIONS

Office Action dated Oct. 17, 2023 in Japan Counterpart Patent Appl. No. 2021-109152, with an English translation thereof.
                    (Continued)

*Primary Examiner* — Jason S Morrow
(74) *Attorney, Agent, or Firm* — GREENBLUM & BERNSTEIN, P.L.C.

(57)                ABSTRACT

A working machine includes a machine body, a cabin which is provided on the machine body and in which an operator's seat where an operator sits is provided, a hood provided behind the cabin, and a condenser for an air conditioner to adjust a temperature inside the cabin, wherein the condenser is provided above the hood such that the condenser faces a lower portion of a rear surface of a rear panel of the cabin.

18 Claims, 18 Drawing Sheets

(51) Int. Cl.
    *E02F 9/16*           (2006.01)
    *E02F 9/26*           (2006.01)

(56)              References Cited

U.S. PATENT DOCUMENTS

| | | |
|---|---|---|
| 2006/0207275 A1 | 9/2006 | Janeling |
| 2015/0165875 A1* | 6/2015 | Uchida ................... E02F 9/163 |
| | | 62/239 |
| 2016/0090712 A1* | 3/2016 | Yamashita ............. B60K 11/04 |
| | | 180/68.1 |
| 2019/0338493 A1 | 11/2019 | Horii |
| 2020/0190774 A1 | 6/2020 | Nishigori et al. |
| 2025/0092637 A1* | 3/2025 | Nishigori ............. B60Q 1/0035 |
| 2025/0109569 A1* | 4/2025 | Nishigori ................. B60H 1/32 |

FOREIGN PATENT DOCUMENTS

| | | |
|---|---|---|
| JP | 1994049552 U | 7/1994 |
| JP | 1995207702 A | 8/1995 |
| JP | 1995243720 A | 9/1995 |
| JP | 2584374 Y2 * | 10/1998 |
| JP | 2000087392 A | 3/2000 |
| JP | 2013244910 A | 12/2013 |
| JP | 2015042885 A | 3/2015 |
| JP | 3211245 U | 6/2017 |
| JP | 2019019572 A | 2/2019 |
| JP | 2019116757 A | 7/2019 |
| JP | 2020007723 A | 1/2020 |
| JP | 2020122291 A | 8/2020 |
| WO | 2005/056320 A1 | 6/2005 |

OTHER PUBLICATIONS

Office Action dated Oct. 17, 2023, in Japan Counterpart Patent Appl. No. 2021-109154, with an English translation thereof.
Office Action dated Oct. 17, 2023 in Japan Counterpart Patent Appl. No. 2021-109153, with an English translation thereof.
International Search Report dated Jun. 7, 2022 in International patent application No. PCT/JP2022/015145, with an English translation thereof.
Written Opinion International dated Jun. 7, 2022 in International patent application No. PCT/JP2022/015145, with an English translation thereof.

\* cited by examiner (Rear)

(Front)

(Front)

(Rear)

WORKING MACHINE

CROSS REFERENCE TO RELATED APPLICATIONS

This application is a continuation application of International Application No. PCT/JP2022/015145 filed on Mar. 28, 2022, which claims the benefit of priority to Japanese Patent Application No. 2021-109152, filed on Jun. 30, 2021, to Japanese Patent Application No. 2021-109153, filed on Jun. 30, 2021, and to Japanese Patent Application No. 2021-109154, filed on Jun. 30, 2021. The entire contents of each of these applications are hereby incorporated herein by reference.

BACKGROUND OF THE INVENTION

1. Field of the Invention

The present invention relates to a working machine such as a small hydraulic shovel (backhoe).

2. Description of the Related Art

A working machine equipped with an air conditioner that cools the interior of a cabin is known.

For example, Japanese Unexamined Patent Application Publication No. 2019-019572 discloses a configuration in which a radiator and an oil cooler are located upstream of a fan that causes cooling air to be taken in an engine room and in which a condenser for an air conditioner is located upstream of the radiator and the oil cooler.

Japanese Unexamined Patent Application Publication No. 2013-244910 discloses a configuration in which a container is provided at a lower portion of a rear wall of a cabin by recessing the rear wall toward the cabin. In the container, a condenser for an air conditioner and so forth are contained.

SUMMARY OF THE INVENTION

However, in PTL 1, since the condenser is provided at the most upstream position in the direction in which the cooling air flows into the engine room, there is a problem in that an increase in the temperature of the cooling air caused by the condenser leads to thermal effects, such as a decrease in the cooling performance of the oil cooler and the radiator and an increase in the temperature of the cooling air in the engine room, on a main machine (working machine).

In the technique described in Japanese Unexamined Patent Application Publication No. 2013-244910, since the container, in which the condenser for an air conditioner and the like are contained, is formed in such a manner as to be recessed from the rear wall portion of the cabin toward the cabin, the space inside the cabin is reduced, and the comfort of the cabin deteriorates. There is another problem in that the heat generated by the condenser or the like may easily be transferred to the cabin through a wall portion of the container in which the condenser for an air conditioner and the like are contained.

Example embodiments of the present invention make it possible to prevent or reduce a thermal effect of a condenser of an air conditioner on a working machine without deteriorating the comfort of a cabin.

A working machine includes a machine body, a cabin which is provided on the machine body and in which an operator's seat where an operator sits is provided, a hood provided behind the cabin, and a condenser for an air conditioner to adjust a temperature inside the cabin, wherein the condenser is provided above the hood such that the condenser faces a lower portion of a rear surface of a rear panel of the cabin.

The condenser may be positioned such that an upper surface thereof is inclined downward in a rearward direction.

The rear panel may be provided with a rear window made of a see-through material. An upper end of the condenser may be lower than a midpoint between upper and lower ends of the rear window and lower than an upper end of a backrest portion of the operator's seat.

The condenser may be positioned inward of an outer edge of the machine body in plan view.

The working machine may further include a support frame in the hood to support the hood, a bracket to support the condenser, and a bracket support member fixed to the support frame and extending through the hood to support the bracket above the hood.

The hood may have a hole portion to allow at least one air-conditioning hose to be guided therethrough, the at least one air-conditioning hose being at least one hose to allow a refrigerant for the air conditioner to flow therethrough.

The working machine may further include a fan to cool the condenser, the fan being provided on or above the hood such that the fan faces the condenser.

The working machine may further include a fan to cool the condenser, the fan being provided on or above the hood such that the fan faces the condenser. The bracket may support the condenser and the fan.

The fan may be an electric fan. The hood may have a hole portion to allow at least one air-conditioning hose and at least one harness to be guided therethrough, the at least one air-conditioning hose being at least one hose to allow a refrigerant for the air conditioner to flow therethrough, the at least one harness being connected to the electric fan.

The working machine may further include an accommodating member to contain the condenser and the fan. The accommodating member may have air inlets which allow air for cooling the condenser to enter the accommodating member, the air inlets being provided in left and right side surfaces of the accommodating member, and an air outlet which allows air that has been used to cool the condenser to be discharged diagonally upward and rearward, the air outlet being provided in a rear surface of the accommodating member, the rear surface being inclined downward in a rearward direction.

The rear surface of the accommodating member that has the air outlet may be inclined downward in the rearward direction. The condenser may be inclined downward in the rearward direction and faces the air outlet. The fan may be provided at a front side of the condenser and configured to blow air diagonally upward and rearward toward the condenser.

The working machine may further include a sight glass used to check a state of an air-conditioning gas used in the air conditioner, the sight glass being positioned such that the sight glass is seen from an outside of the accommodating member through at least one of the air inlets.

The working machine may further include a support frame in the hood to support the hood, and a bracket to support the condenser and the fan above the hood. The support frame may include a bracket support member provided at an upper portion of the support frame and extending through the hood to support the bracket above the hood.

A receiver to store a refrigerant for the air conditioner may be provided on one side of the condenser in the accommodating member.

The rear panel may be provided with a rear window made of a see-through material. An upper end of the condenser may be lower than a midpoint between upper and lower ends of the rear window and lower than an upper end of a backrest portion of the operator's seat.

The condenser may be positioned inward of an outer edge of the machine body in plan view.

The hood may have a hole portion to allow the bracket support member to extend therethrough.

The working machine may further include a receiver to store a refrigerant for the air conditioner. The bracket may support the receiver.

The bracket support member may be a boss member fixed to an upper surface of the support frame.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
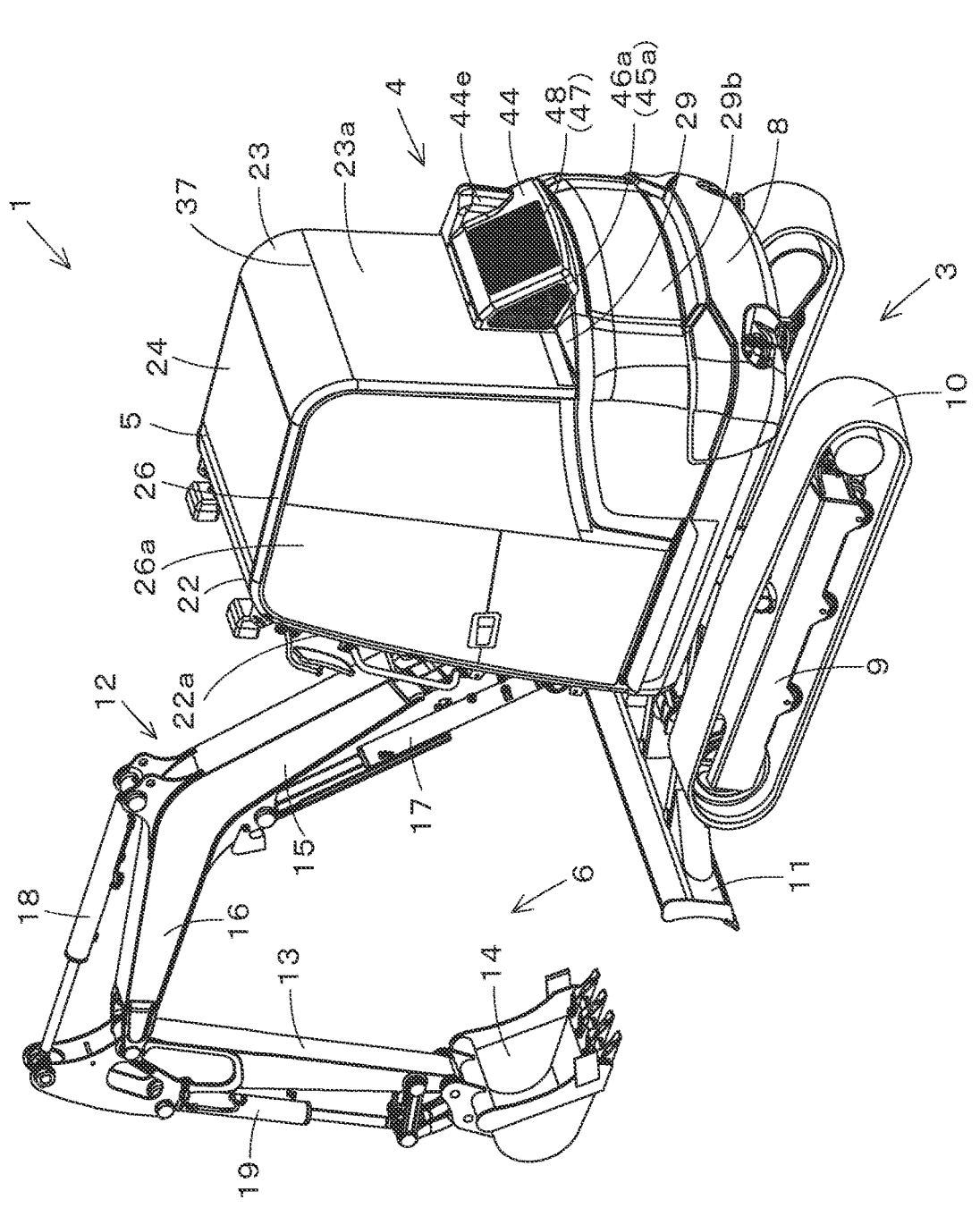
FIG. 1 is a rear perspective view schematically illustrating an overall configuration of a backhoe that is an example of a working machine of the present invention.

The example embodiments will now be described with reference to the accompanying drawings, wherein like reference numerals designate corresponding or identical elements throughout the various drawings. The drawings are to be viewed in an orientation in which the reference numerals are viewed correctly.

An embodiment of a working machine 1 of the present invention will be described below with reference to the drawings.

Note that the embodiment, which will be described below, is an example in which the present invention is embodied, and the configuration of the present invention is not limited to the specific example. However, in the present embodiment, a backhoe 1 will be described as an example.

FIG. 1 to FIG. 16 and the like illustrate the backhoe 1, which is an example of the working machine 1.

In the following description of the present embodiment, the side toward which an operator O in an operator's seat 27 in a cabin 5 faces is referred to as the front side of the backhoe 1, and the rear side of the operator O is referred to as the rear side of the backhoe 1. The right-hand side of the operator O is referred to as the right-hand side of the backhoe 1, and the left-hand side of the operator O is referred to as the left-hand side of the backhoe 1. The horizontal direction that is perpendicular to the front-rear direction of the backhoe 1 will be referred to as a machine-body width direction.

When the working machine 1 is viewed in plan view, the working machine 1 is turnable about a turning axis X1. The turning axis X1 is an axis that vertically extends in such a manner as to pass through the center of a slewing bearing 7. A centerline of the working machine 1 when the working machine 1 is viewed in plan view will be denoted by Y1. The centerline Y1 is a line that passes the turning axis X1 and extends in the front-rear direction. As illustrated in FIG. 1 to FIG. 4 and the like, the backhoe 1 includes an upper turnable body 2 and a lower traveling body 3. The upper turnable body 2 includes a machine body 4, the cabin 5, and a working device 6. The upper turnable body 2 (the machine body 4) is mounted on the lower traveling body 3 in such a manner as to be turnable around a vertical axis of the slewing bearing 7. A weight 8 is provided on a rear portion of the machine body 4. The lower traveling body 3 includes a traveling frame 9, a crawler traveling device 10, and a dozer device 11. The traveling device 10 may be a tire traveling device.

The working device 6 is positioned in front of the cabin 5. The working device 6 is attached to the machine body 4. The working device 6 includes a boom 12 that is driven by a boom cylinder 17, an arm 13 that is driven by an arm cylinder 18, and a bucket (a working tool) 14 that is driven by a bucket cylinder 19.

A prime mover 20 is provided in an engine compartment 21 of the machine body 4, the engine compartment 21 being provided at a position behind and below the cabin 5. The prime mover 20 is horizontally placed in the engine compartment 21. Note that, when the prime mover is horizontally placed, the axis of a crankshaft of the prime mover 20 extends in the machine-body width direction. Note that this placement position of the prime mover 20 is an example.

In the present embodiment, the prime mover 20 is a diesel engine. Note that the prime mover 20 may be a gasoline engine, an LPG engine, or an electric motor or may be a hybrid prime mover that includes an engine and an electric motor.

Figure 4:
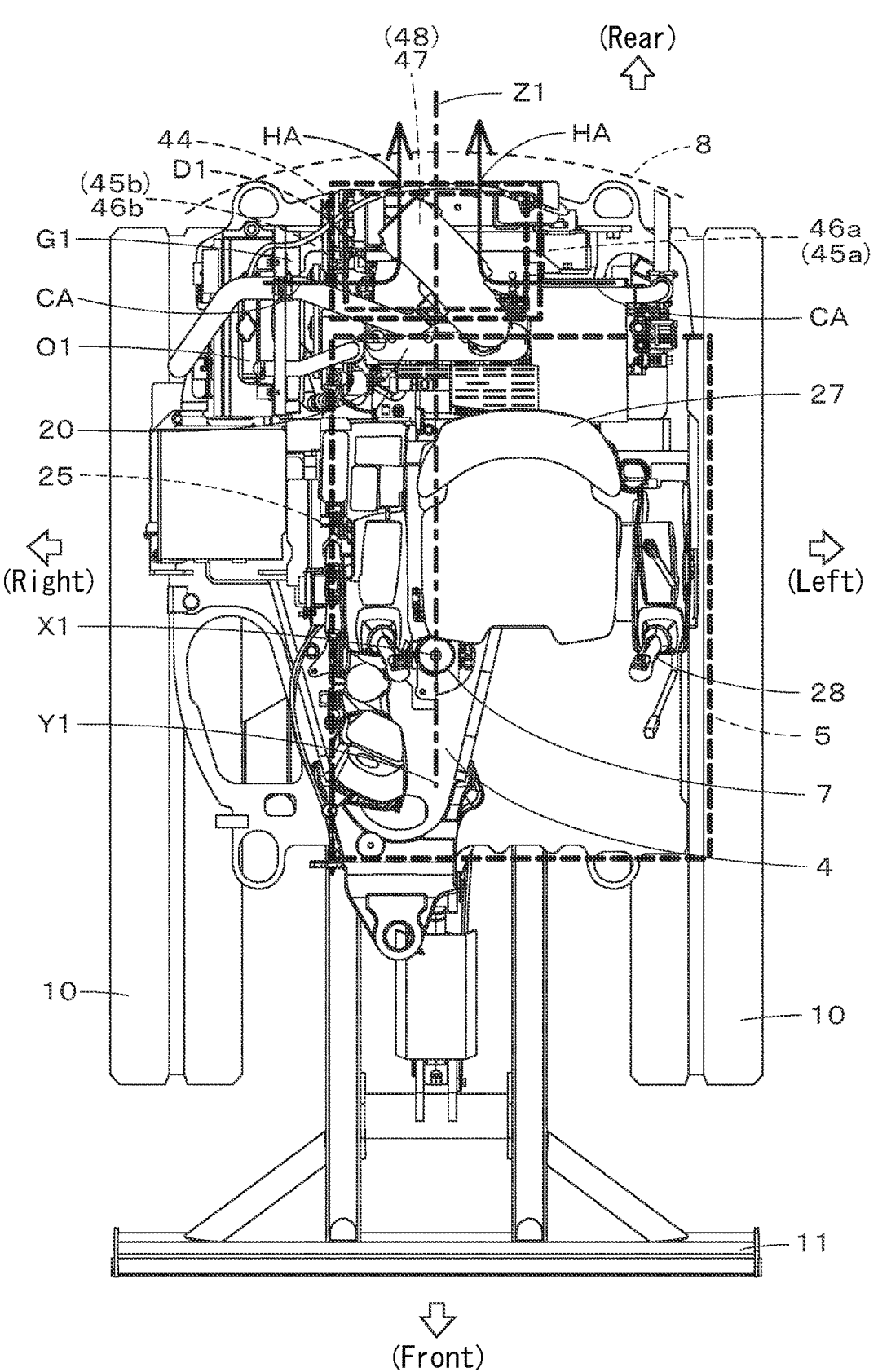
FIG. 4 is a plan view schematically illustrating an overview of the backhoe to which the present invention is applied.
Figure 5:
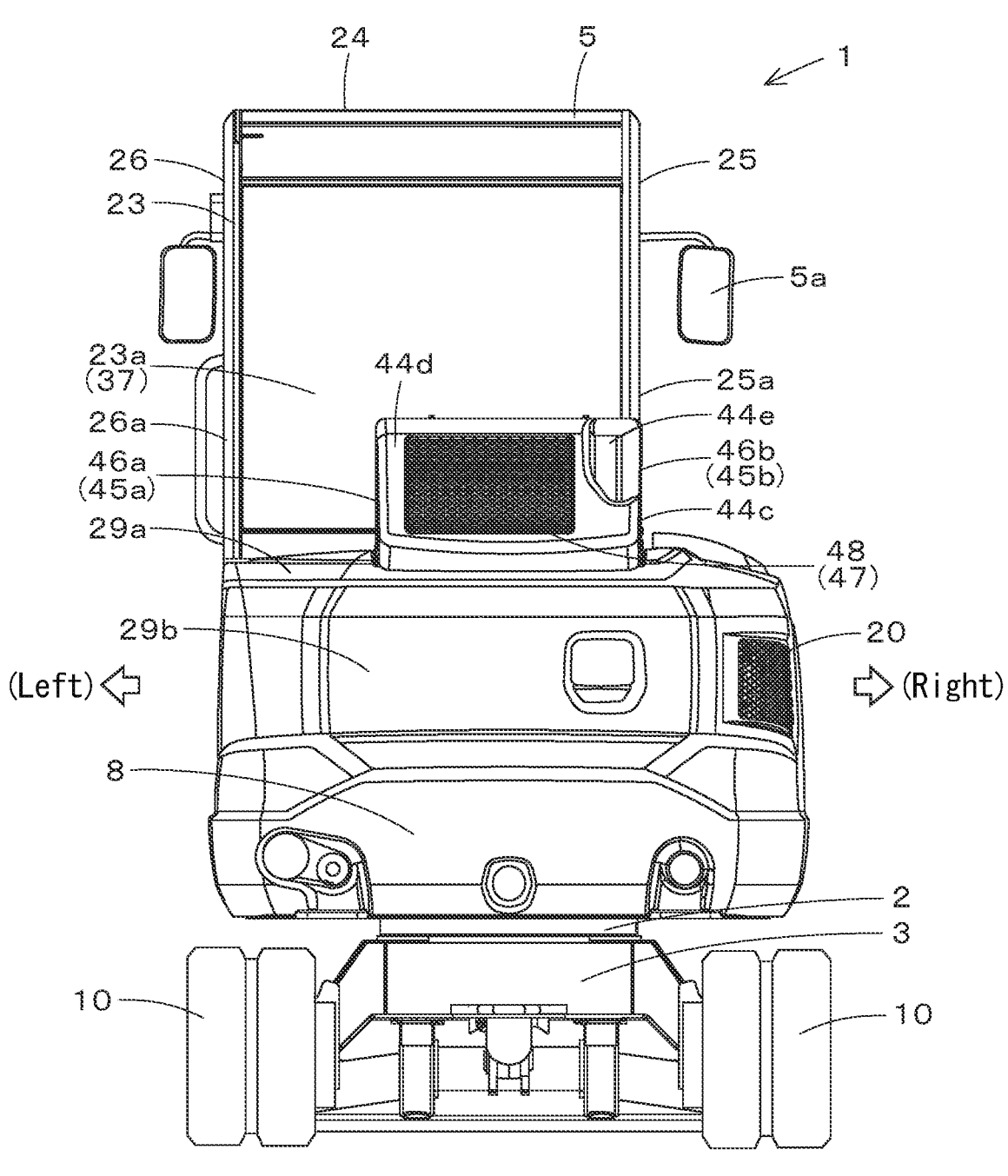
FIG. 5 is a rear view schematically illustrating an overview of the backhoe to which the present invention is applied.

As illustrated in FIG. 4, in the engine compartment 21, the prime mover 20, a radiator G1, and an oil cooler O1 are arranged in this order from the side where a center portion of the backhoe 1 is located toward the outside in the machine-body width direction. The radiator G1 is a cooler that cools cooling water of the prime mover 20. The radiator G1 is provided with a cooling fan that cools the cooling water flowing through the radiator G1. The oil cooler O1 is a cooler that cools a hydraulic fluid.

As illustrated in FIG. 1, FIG. 2, FIG. 3, and FIG. 5, the machine body 4 includes the cabin 5 capable of accommodating the operator (a driver) O. The cabin 5 includes a front panel 22 provided on the front surface thereof, a rear panel 23 provided on the rear surface thereof, a roof panel 24 provided on the upper surface thereof, a side panel 25 provided on the right side surface thereof, and a door panel 26 provided on the left side surface thereof.

The front panel 22 is provided with a front window 22a. The rear panel 23 is provided with a rear window 23a that is made of a see-through material. The side panel 25 is provided with a right side window 25a. The door panel 26 is provided with a left side window 26a. Accordingly, the operator O in the cabin 5 can visually recognize the outside from the inside of the cabin 5 through the front window 22a, the rear window 23a, the right side window 25a, and the left side window 26a.

As illustrated in FIG. 4, the operator's seat (a seat) 27 where the operator (the driver) 0 sits and a manipulator 28 are provided in the cabin 5. In the machine-body width direction of the machine body 4, the cabin 5 is positioned on the left side of the centerline Y1, which passes the turning axis X1 and extends in the front-rear direction. A hood 29 is provided behind the cabin 5. The hood 29 projects rearward.

As illustrated in FIG. 6 to FIG. 16 and the like, the hood 29 is supported by a support frame 30 provided in the engine compartment 21 and is shaped so as to cover the support frame 30. The support frame 30 includes a plurality of leg members (a first leg 31a, a second leg 31b, and a third leg 31c) and a beam member 32. Each of the plurality of leg members are arranged in a standing manner at positions behind a partition plate 4e of a slewing board 4a. The beam member 32 is fixed to upper portions of the plurality of leg members 31a to 31c.

Figure 7:
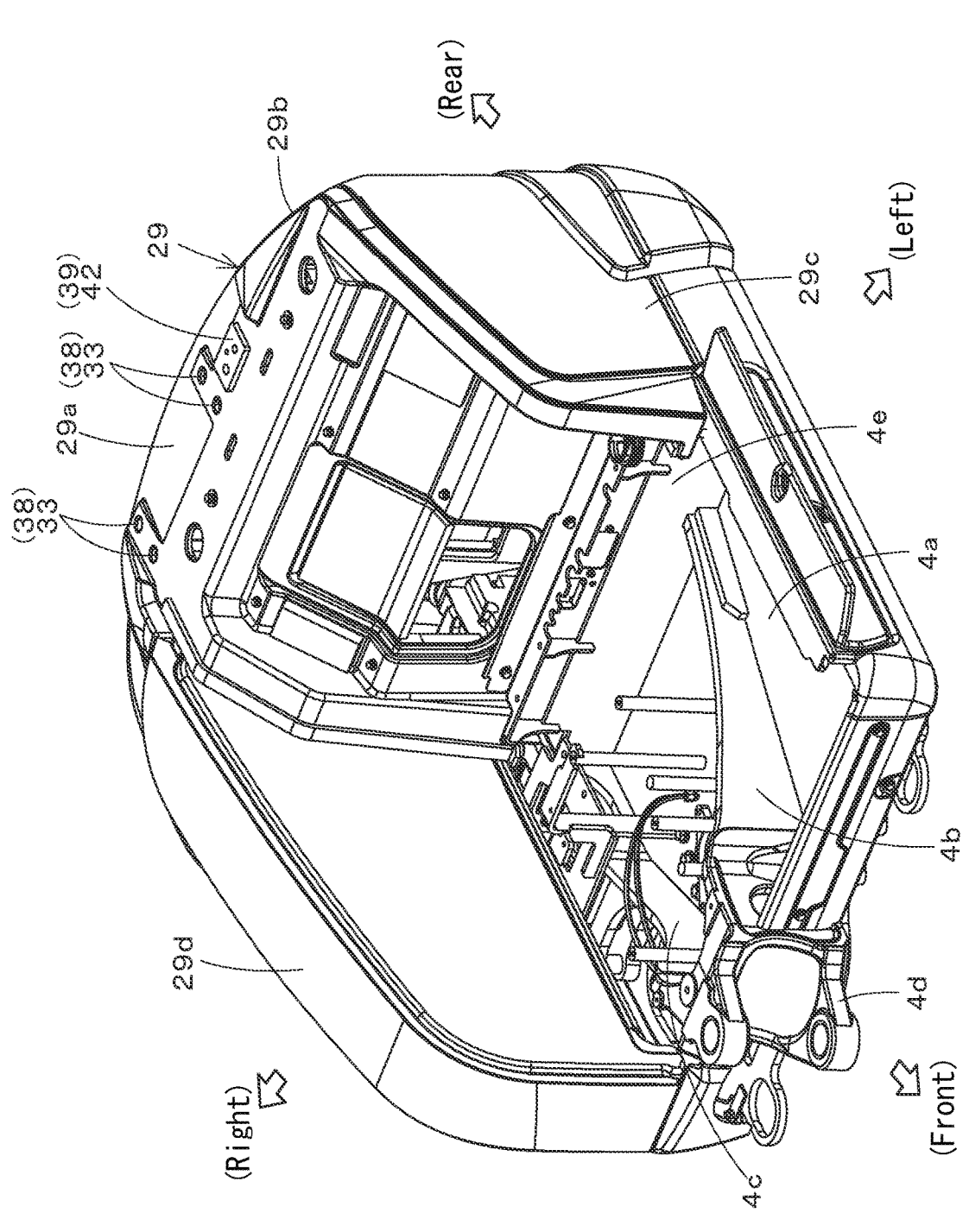
FIG. 7 is a front perspective view schematically illustrating an overview including a hood center, an exterior cover, and so forth.
Figure 8:
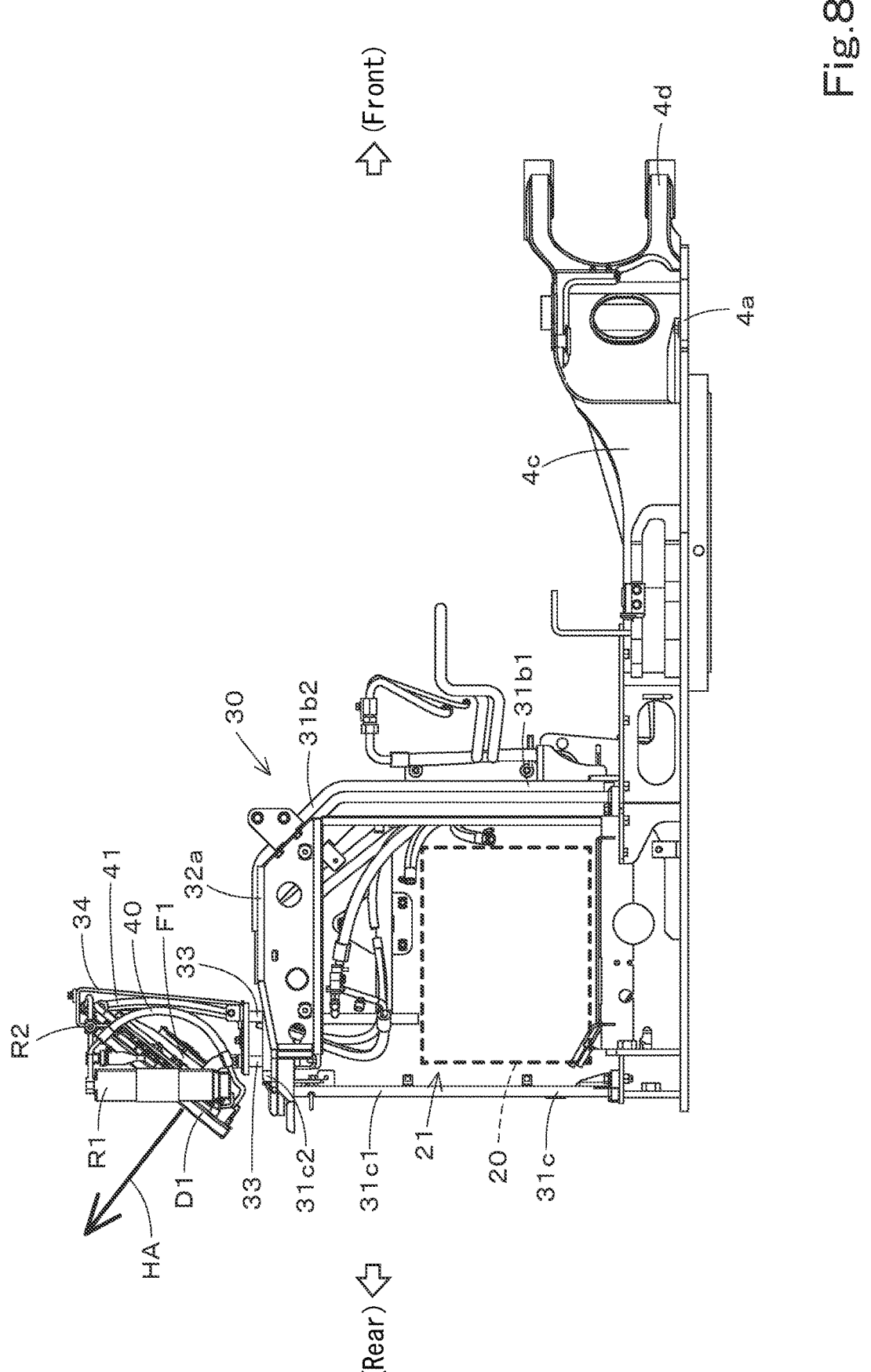
FIG. 8 is a side view schematically illustrating an overview including the machine body, the support frame, the condenser, and so forth.
Figure 9:
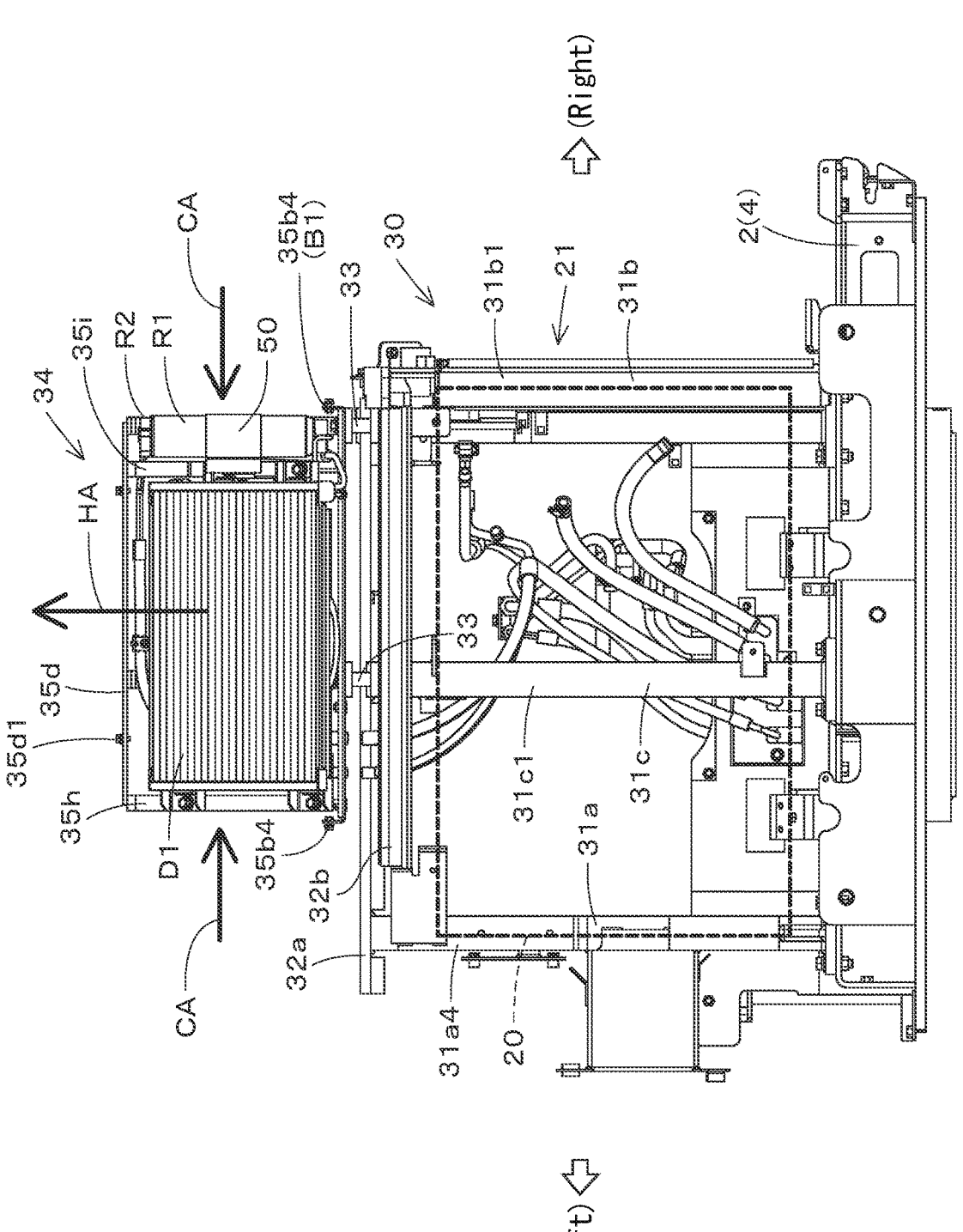
FIG. 9 is a rear view schematically illustrating an overview including the machine body, the support frame, the condenser, and so forth.

As illustrated in FIG. 7, the hood 29 includes a hood center 29a, a rear hood 29b, a left side hood 29c, and a right side hood 29d. The hood center 29a is a cover member that forms an upper portion and a front portion of the engine compartment 21, and the interior (the inside) of the cabin 5 and the engine compartment 21 are isolated from each other by the hood center 29a. The rear hood 29b is a cover member that forms a rear portion of the engine compartment and is attached to the support frame 30. The left side hood 29c is a cover member that forms a left portion of the engine compartment 21. The right side hood 29d is a cover member that forms a right portion of the engine compartment 21. The portions of the hood 29 may be integrally molded with, for example, a resin or the like. Each of the portions of the hood 29 may be formed of a sheet metal or may be formed by combining a resin and a sheet metal.

Figure 6:
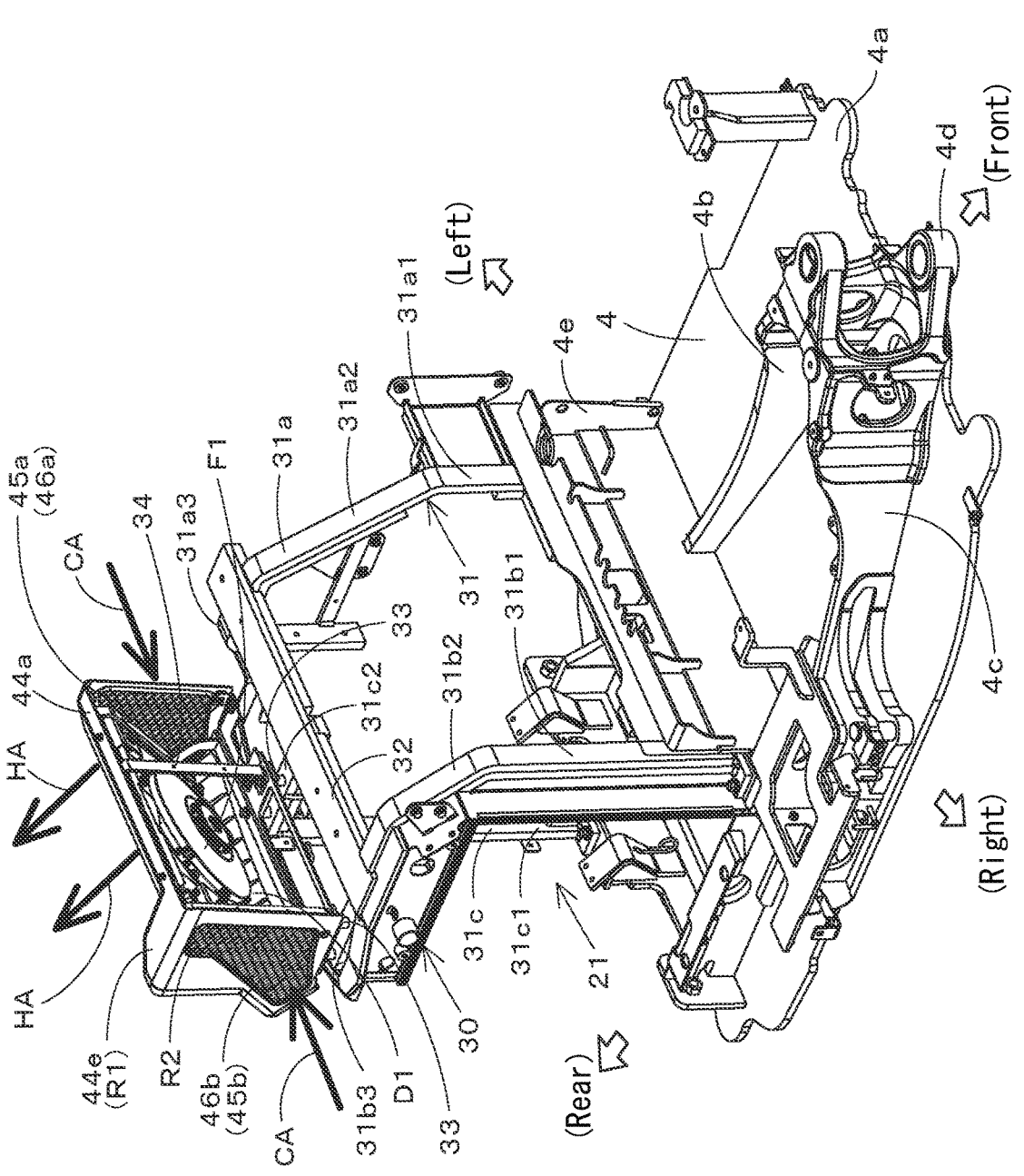
FIG. 6 is a front perspective view schematically illustrating an overview including a machine body, a support frame, a condenser, and so forth.

As illustrated in FIG. 6 and the like, the machine body 4 includes the slewing board (a board) 4a, a plurality of vertical ribs (a first vertical rib 4b and a second vertical rib 4c), a support bracket 4d, the partition plate 4e, and the support frame 30. The slewing board 4a is formed of a thick steel plate or the like and provided such that the plate surfaces thereof are oriented in the vertical direction. The slewing board 4a is supported, so as to be turnable around the turning axis X1, on the lower traveling body 3 with the slewing bearing 7 interposed therebetween.

Figure 2:
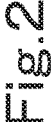
FIG. 2 is a left side view schematically illustrating an overview of the backhoe to which the present invention is applied.
Figure 3:
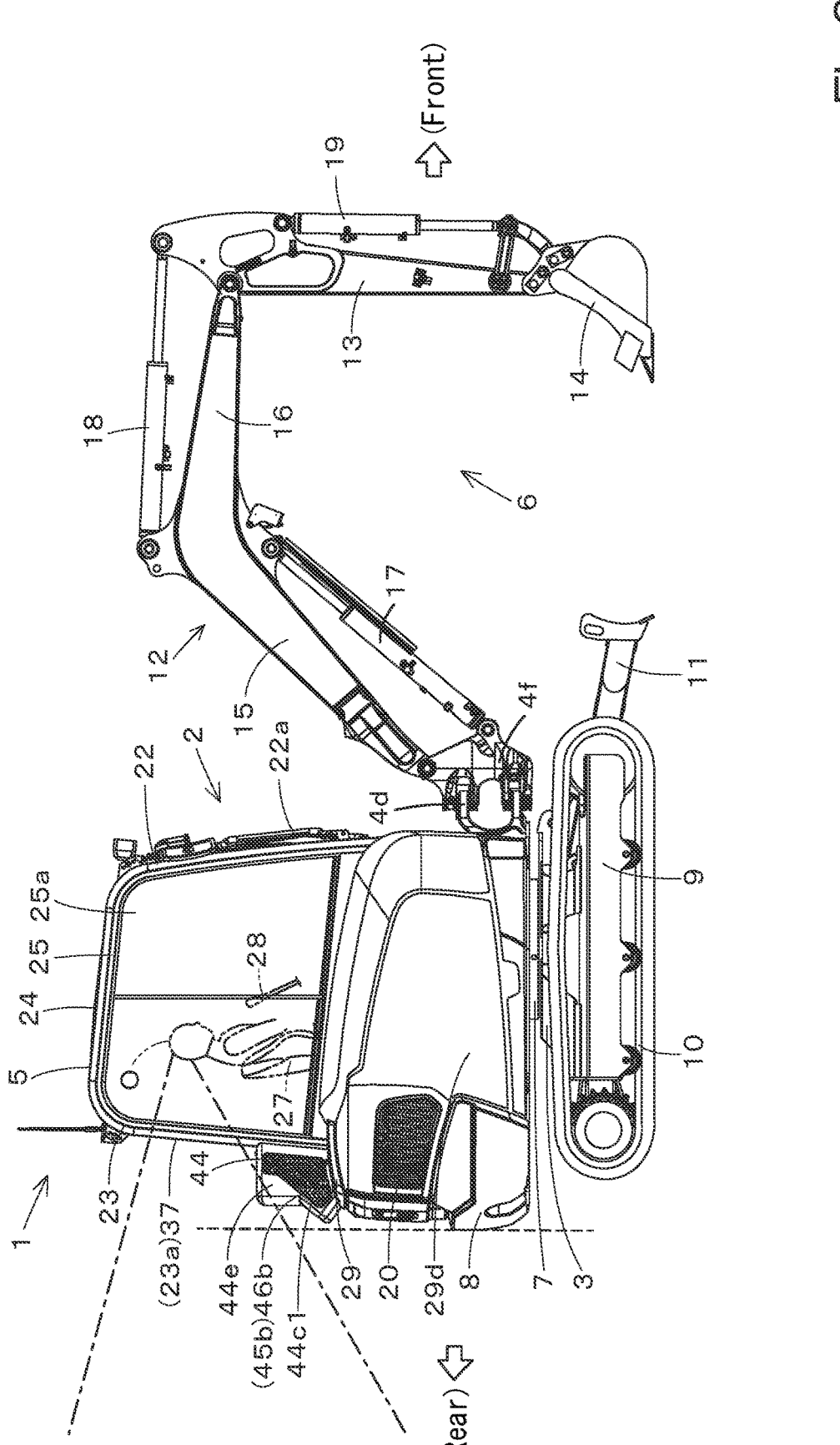
FIG. 3 is a right side view schematically illustrating an overview of the backhoe to which the present invention is applied.

As illustrated in FIGS. 2 and 3 and the like, a swing bracket 4f is attached to the support bracket 4d so as to be swingable around a vertical axis (an axis extending in the vertical direction). A base end of the working device 6 (the boom 12) is attached to the swing bracket 4f so as to be pivotable around a horizontal axis.

As illustrated in FIG. 6 and the like, the partition plate 4e is a member that borders a front lower portion of the engine compartment 21. The plate surfaces of the partition plate 4e are oriented in the front-rear direction, and the partition plate 4e is provided at a rear portion of the slewing board 4a such that the partition plate 4e extends in a direction from one of opposite sides of the machine body in the machine-body width direction (left side) to the other of the opposite sides of the machine body in the machine-body width direction (right side).

As illustrated in FIG. 6 and the like, the first leg 31a of the support frame 30 includes a first pillar portion 31a1, a first extension portion 31a2, a first horizontal portion 31a3, and a first vertical portion 31a4. The first pillar portion 31a1 is provided in a standing manner on the left side of a front portion of the engine compartment 21 and extends in the upward direction. More specifically, the lower end of the first pillar portion 31a1 is attached to the left side of the rear surface of the partition plate 4e. The first extension portion 31a2 is bent obliquely upward toward the rear side from the upper end of the first pillar portion 31a1 and extends. The first horizontal portion 31a3 is bent rearward from the upper end of the first extension portion 31a2 and extends horizontally. The first vertical portion 31a4 is bent downward from the end of the first horizontal portion 31a3 and extends vertically.

As illustrated in FIG. 6 and the like, the second leg 31b includes a second pillar portion 31b1, a second extension portion 31b2, and a second horizontal portion 31b3. The second pillar portion 31b1 is provided in a standing manner on the right side of the front portion of the engine compartment 21 and extends in the upward direction. More specifically, the lower end of the second pillar portion 31b1 is attached to the right side of the partition plate 4e. In other words, the lower end of the second pillar portion 31b1 is located forward of the first pillar portion 31a1. The second extension portion 31b2 is bent obliquely upward toward the rear side from the upper end of the second pillar portion 31b1 and extends. The second horizontal portion 31b3 is bent rearward from the upper end of the second extension portion 31b2 and extends horizontally. In addition, the second horizontal portion 31b3 extends horizontally in such a manner as to extend through the beam member 32. The second horizontal portion 31*b*3 is provided with boss members 33.

As illustrated in FIG. 6 and the like, the third leg 31*c* includes a third pillar portion 31*c*1 and a third horizontal portion 31*c*2. The third pillar portion 31*c*1 is provided in a standing manner at the center of the rear portion of the engine compartment 21 and extends in the upward direction. The third horizontal portion 31*c*2 is bent forward from the upper end of the third pillar portion 31*c*1 and extends horizontally. The third horizontal portion 31*c*2 is provided with other boss members 33.

Figure 16:
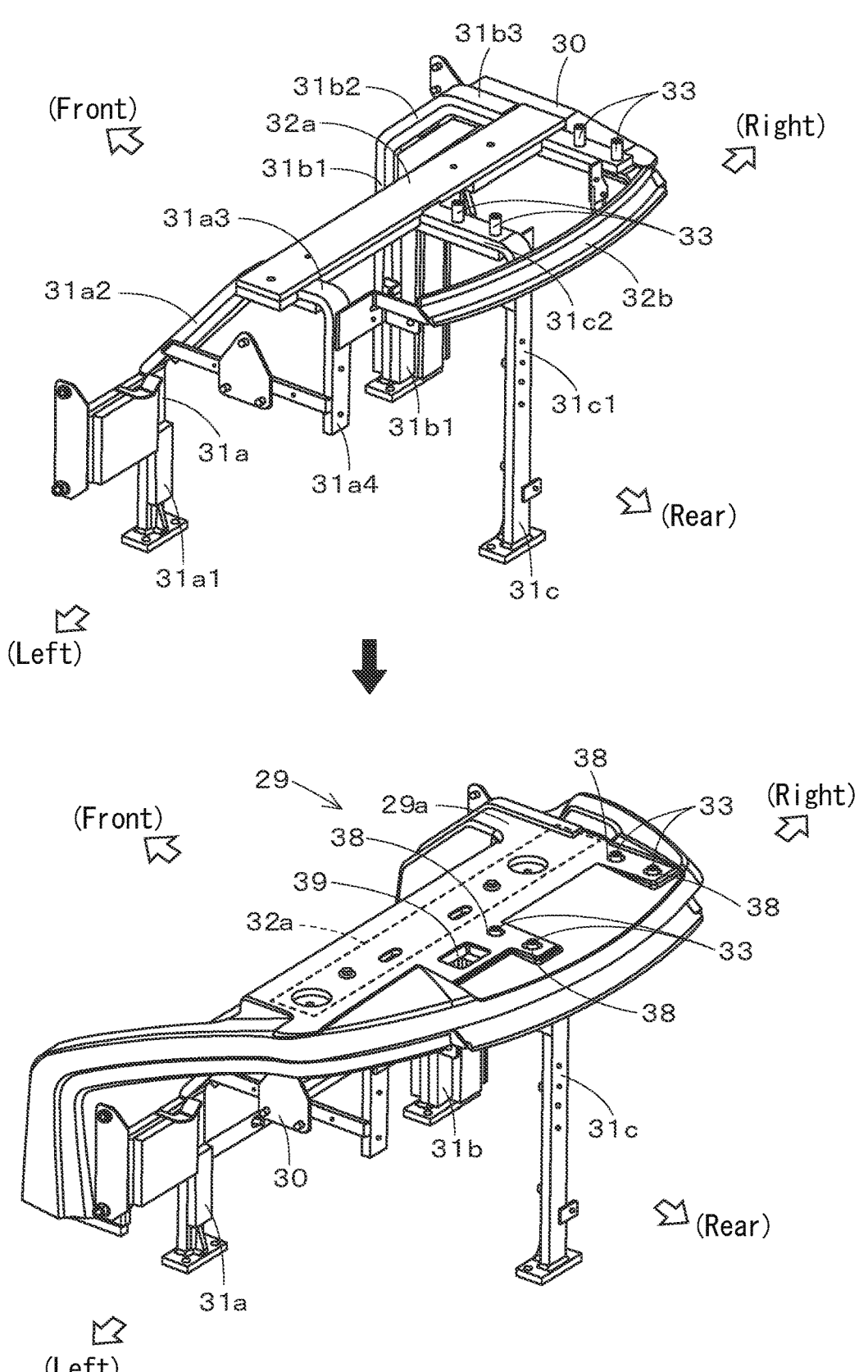
FIG. 16 is a rear perspective view schematically illustrating the support frame provided with boss members and the hood covering the support frame.

As illustrated in FIG. 6 and the like, the beam member 32 is positioned such that the plate surfaces thereof face upward and downward and such that the longitudinal direction thereof coincides with the machine-body width direction. The beam member 32 includes a first beam member 32*a* and a second beam member 32*b*. The first beam member 32*a* is placed in such a manner as to extend across the upper end of the first horizontal portion 31*a*3, the upper end of the second horizontal portion 31*b*3, and the upper end of the third horizontal portion 31*c*2 and is fixed to each of these horizontal portions 31*a*3, 31*b*3, and 31*c*2. More specifically, as illustrated in FIG. 6 and the like, the first beam member 32*a* extends rightward from the upper end of the first horizontal portion 31*a*3, passes through the third horizontal portion 31*c*2, and reaches the upper end of the second horizontal portion 31*b*3. As illustrated in FIG. 16 and the like, the second beam member 32*b* extends rightward from the end (the rear end) of the first extension portion 31*a*2 and reaches the first vertical portion 31*a*4.

The backhoe 1 of the present embodiment includes an air conditioner capable of adjusting the temperature inside the cabin 5.

The air conditioner includes an evaporator, an air-blowing fan, a compressor, a condenser D1, an electric fan (condenser fan) F1, a receiver R1, and/or the like. These components are connected to one another by pipe(s), and refrigerant flows through them.

The evaporator cools the air that is to be blown into the cabin by exchanging heat between the refrigerant and the air having been blown into the cabin by the air-blowing fan.

The compressor compresses the vaporized refrigerant. The condenser D1 is a cooler (condenser) that cools the refrigerant that has been compressed. The receiver R1 temporarily stores the refrigerant that has been condensed.

The evaporator and the air-blowing fan are positioned in a lower portion of the cabin 5.

In the present embodiment, the electric fan F1, the condenser D1, and the receiver R1 of the air conditioner (AC system) are provided behind the cabin 5 and above the hood center 29*a*. As illustrated in FIGS. 2 and 3 and the like, the upper end of the condenser D1 is lower than the midpoint between the upper and lower ends of the rear window 23*a* and lower than an upper end of a backrest portion of the operator's seat 27. As illustrated in FIG. 4 and the like, when viewed in plan view, the condenser D1 is positioned inward of an outer edge of the machine body 4.

As illustrated in FIGS. 13 to 16 and the like, the boss members (bracket support members) 33 to which a bracket 34 is to be attached are provided at an upper portion of the support frame 30. The boss members 33 are fixed to the support frame 30 and extend through the hood 29 to support the bracket 34 above the hood 29. Each of the boss members 33 is a cylindrical member and is fixed to the upper portion of the support frame 30 by welding. Each of the boss members 33 has an internal thread in its tubular portion. The bracket 34, which will be described later, is fastened to the boss members 33 by screwing bolts B1 into the boss members 33.

In the present embodiment, the second horizontal portion 31*b*3 of the second leg 31*b* is provided with boss members 33. The two boss members 33 are arranged in a line along the front-rear direction. The third horizontal portion 31*c*2 of the third leg 31*c* is provided with other boss members 33. The other two boss members 33 are arranged in a line along the front-rear direction.

Figure 13:
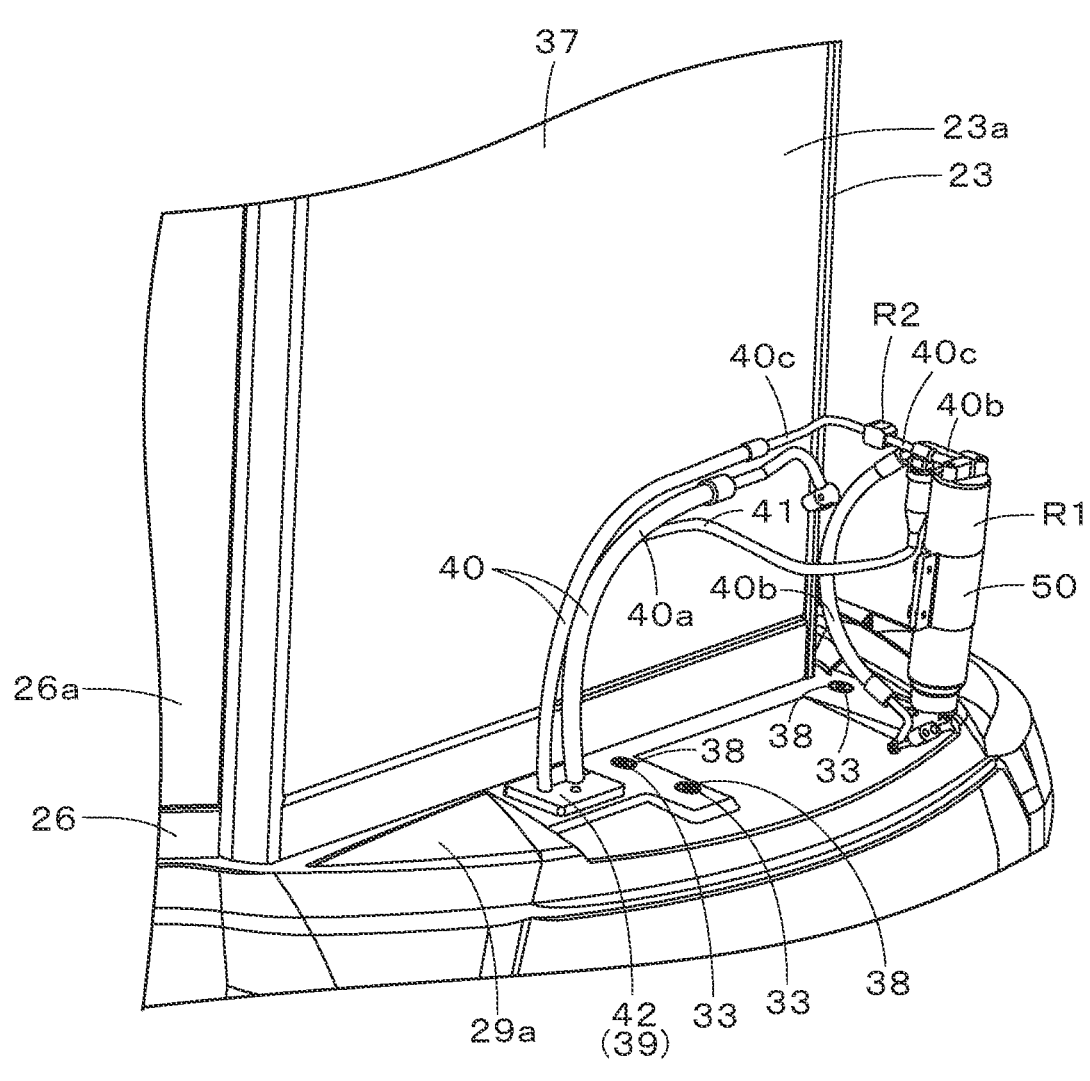
FIG. 13 is a rear perspective view schematically illustrating a routing state of AC hoses and control wiring lines.

As illustrated FIG. 13, four circular hole portions 38 are provided in a rear portion of the hood center 29*a*. More specifically, these hole portions 38 are provided at positions corresponding to the boss members 33 and each have a diameter slightly larger than the outer diameter of a corresponding one of the boss members 33 such that the boss members 33 extend through the hole portions 38.

Figure 14:
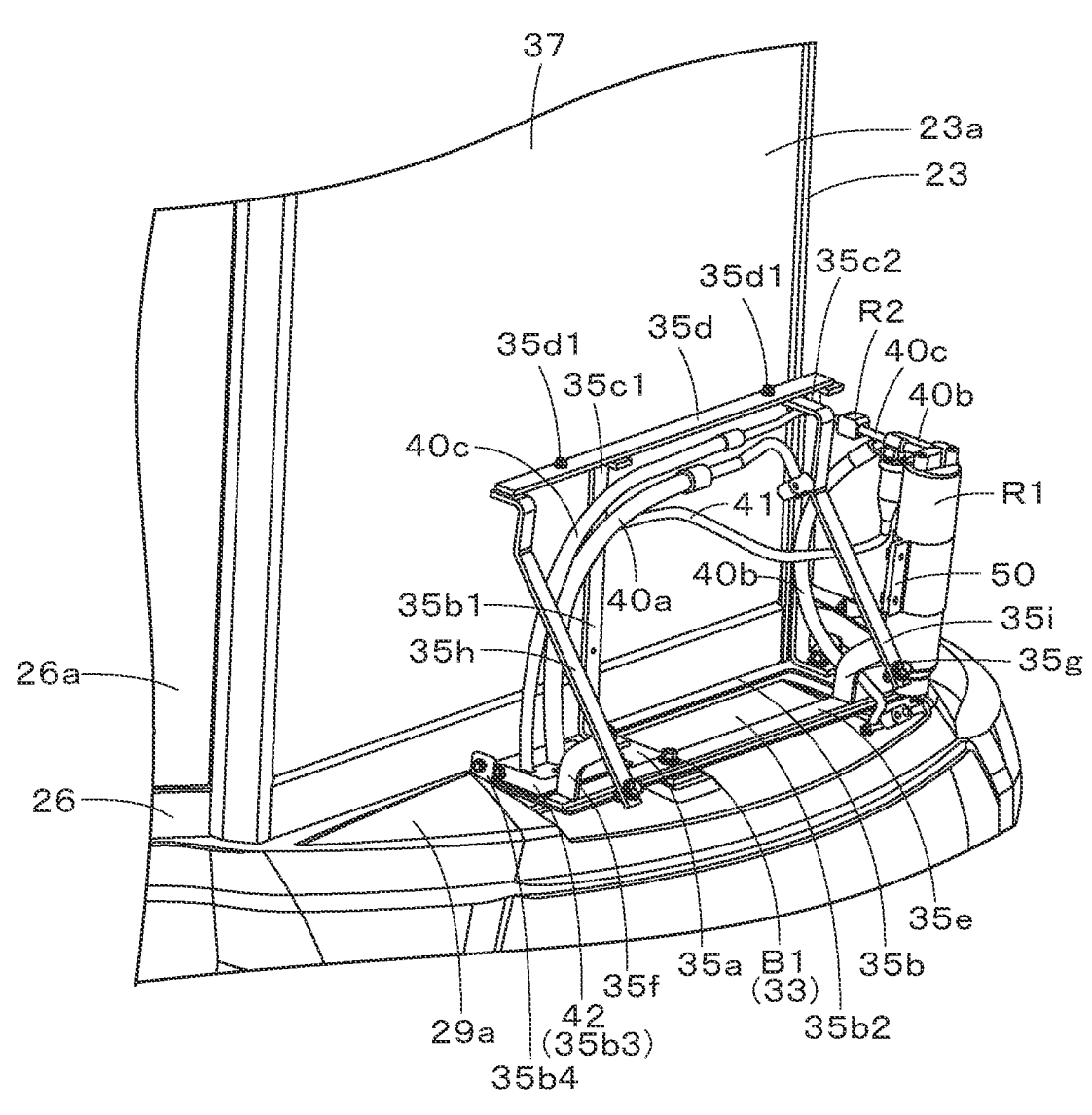
FIG. 14 is a rear perspective view schematically illustrating a state where a bracket of the condenser is mounted on the hood.

The bracket 34 will now be described. As illustrated in FIG. 14 and the like, the bracket 34 includes a support member 35 that is provided on the hood center 29*a* and a base 36 to which the condenser D1 is attached.

The support member 35 includes a pair of seal cushions 35*a*, a support plate 35*b*, pillars 35*c*, a first lateral portion 35*d*, a second lateral portion 35*e*, a first holding portion 35*f*, a second holding portion 35*g*, a first vertical portion 35*h*, and a second vertical portion 35*i*.

Figure 11A:
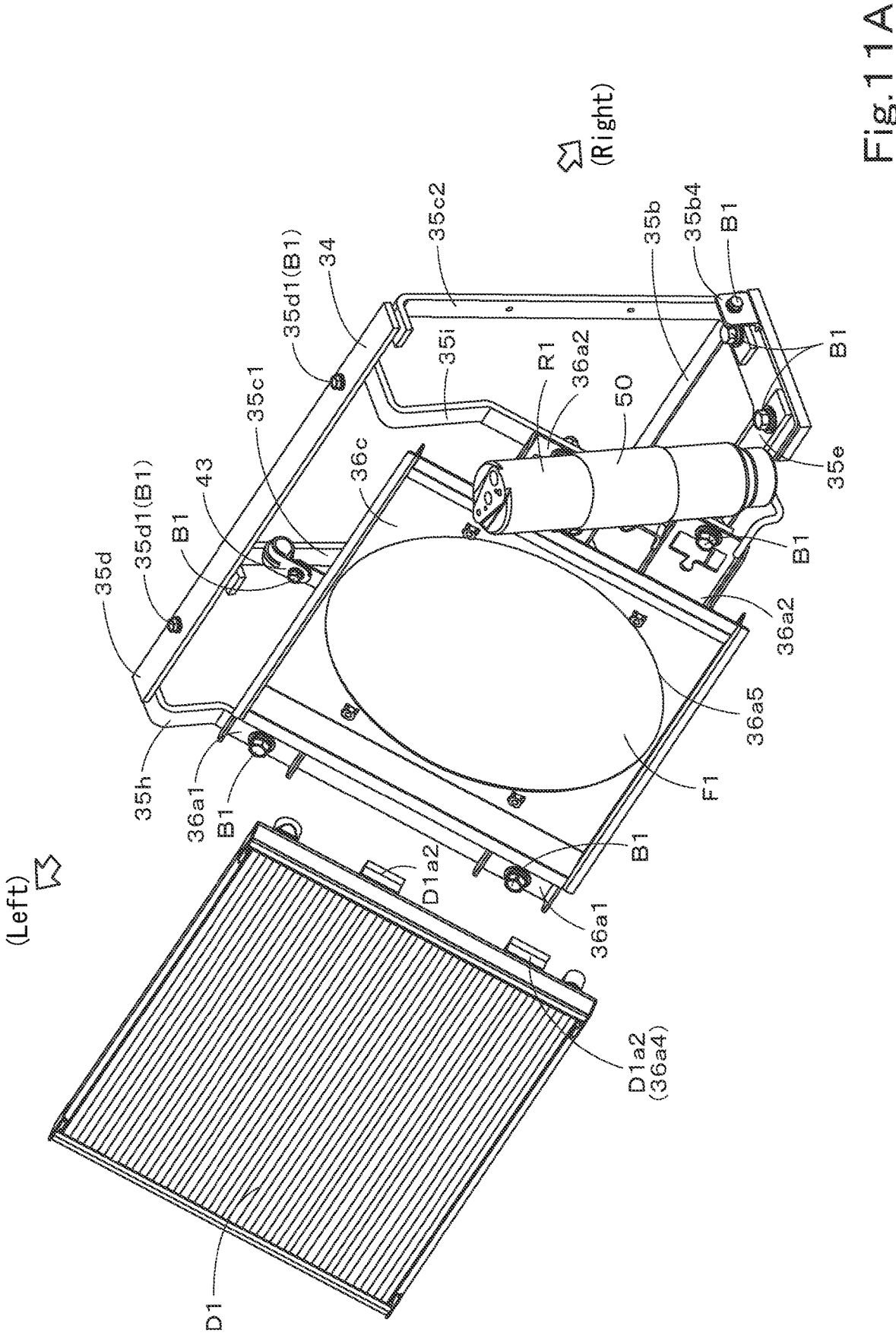
FIG. 11A is a perspective view schematically illustrating an overview including the condenser and the electric fan.
Figure 11B:
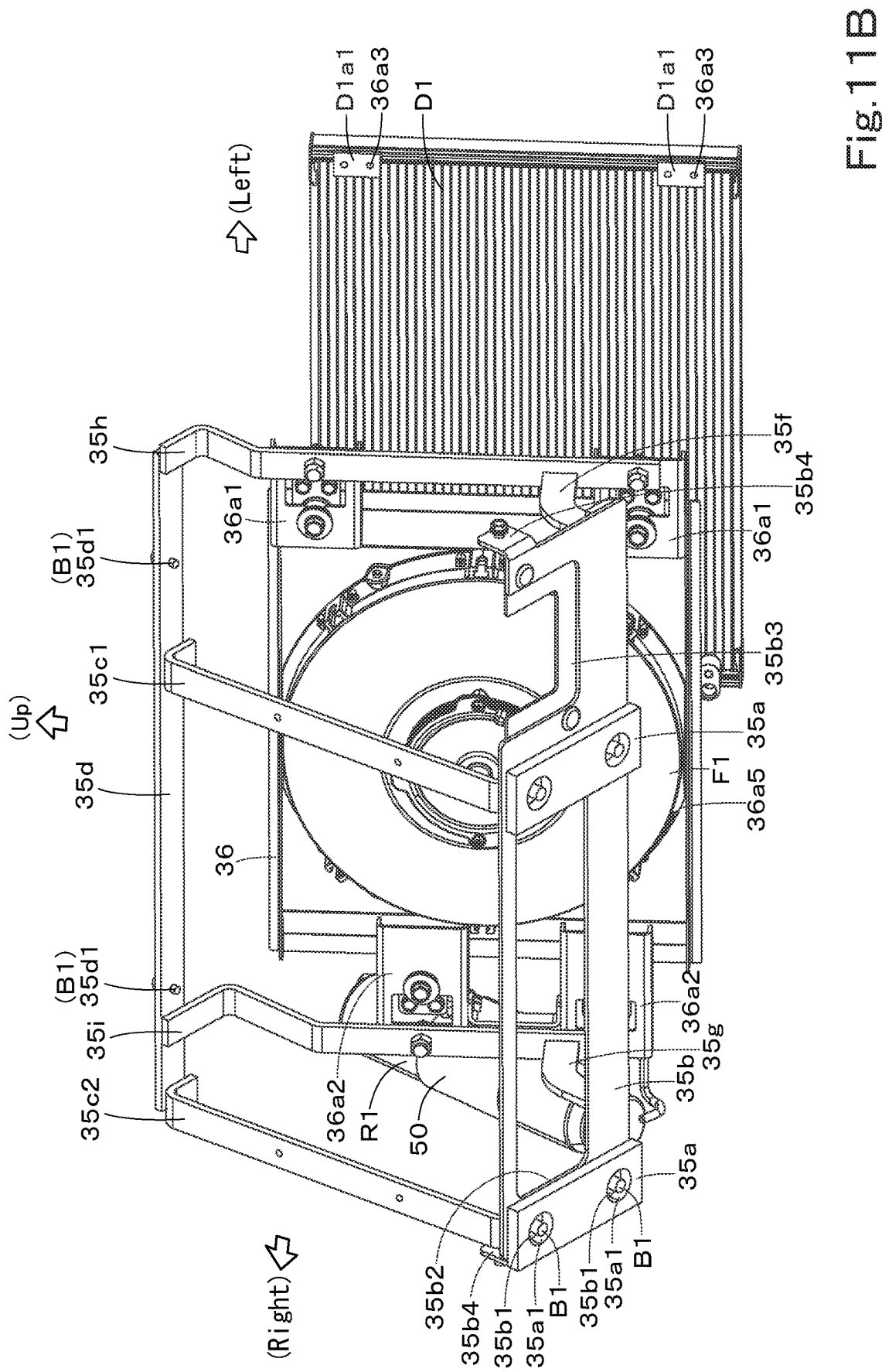
FIG. 11B is a perspective view schematically illustrating an overview including the condenser and the electric fan.

As illustrated in FIGS. 11B and 14 and the like, the pair of seal cushions 35*a* are provided above the boss members 33 and are spaced apart from each other in the machine-body width direction. Each of the pair of seal cushions 35*a* is a plate that extends in the front-rear direction and has a rectangular shape when viewed in plan view. The seal cushions 35*a* are seal members to prevent or reduce the discharge of the air from the engine compartment 21 to the outside through the hole portions 38. The pair of seal cushions 35*a* have hole portions 35*a*1 at positions corresponding to the boss members 33.

As illustrated in FIGS. 11A, 11B, and 14 and the like, the support plate 35*b* is a long plate that is provided on the hood center 29*a*. The support plate 35*b* is a plate that extends in the machine-body width direction and has a rectangular shape when viewed in plan view. The support plate 35*b* extends leftward from the upper surface of one of the pair of seal cushions 35*a* that is closer to the other of the opposite sides of the machine body in the machine-body width direction (right side) and extends beyond the other seal cushion 35*a* that is closer to the one of the opposite sides of the machine body in the machine-body width direction (left side).

The support plate 35*b* has hole portions at positions corresponding to the boss members 33 (positions corresponding to the hole portions of the pair of seal cushions 35*a*), and the bolts B1 extend through these hole portions. In other words, by fastening the support plate 35*b* to the boss members 33, which are provided on the support frame 30, using the bolts B1, the support member 35 is attached to the support frame 30. That is, the boss members 33 support the support plate 35*b* of the support member 35 from the upper portion of the beam member 32 through the hole portions 38 of the hood center 29*a*.

As illustrated in FIGS. 11A, 11B, and 14 and the like, the support plate 35*b* has hole portions 35*b*1. The hole portions 35*b*1 are each a hole that has a circular shape when viewed in plan view and are provided at positions corresponding to the boss members 33 (positions corresponding to the hole portions 35*a*1 of the pair of seal cushions 35*a*).

The support plate 35b has, in a region (first region) thereof between the pair of seal cushions 35a, a hole portion 35b2 extending through the support plate 35b in the vertical direction. The support plate 35b has a cutout portion 35b3 in a region (second region) closest to the one of the opposite sides of the machine body in the machine-body width direction (left side). The hole portion 35b2 has a rectangular shape when viewed in plan view and has a longitudinal direction extending along the machine-body width direction. The cutout portion 35b3 extends from the front end of the support plate 35b rearward.

The pillars 35c extend upward from the support plate 35b. In the present embodiment, the pair of pillars 35c extend upward such that they are spaced apart from each other in the machine-body width direction. The left pillar 35c1 and the right pillar 35c2 are provided at positions corresponding to the hole portions 35b1 of the support plate 35b, that is, positions corresponding to the boss members 33. More specifically, the left pillar 35c1 and the right pillar 35c2 are welded to the support plate 35b and attached to the boss members 33 by being fastened together with the support plate 35b using the bolts B1. The left pillar 35c1 is attached to the front hole portion 35b1 that is closer to the one of the opposite sides of the machine body in the machine-body width direction (that is closer to the left side of the machine body) of the support plate 35b, and the right pillar 35c2 is attached to the front hole portion 35b1 that is closer to the other of the opposite sides of the machine body in the machine-body width direction (that is closer to the right side of the machine body) of the support plate 35b.

As illustrated in FIGS. 11A, 11B, and 14 and the like, each of the pillars 35c extends forward along the upper surface of the support plate 35b and then is bent obliquely upward and forward, and its upper end portion is bent rearward.

As illustrated in FIGS. 11A, 11B, and 14 and the like, the first lateral portion 35d is positioned such that the plate surfaces thereof face upward and downward and such that the first lateral portion 35d extends in the machine-body width direction. The first lateral portion 35d is placed to bridge the gap between the upper end of the left pillar 35c1 and the upper end of the right pillar 35c2 and is fixed to these pillars 35c1 and 35c2.

The second lateral portion 35e is positioned such that the plate surfaces thereof face upward and downward and such that the second lateral portion 35e extends in the machine-body width direction. The second lateral portion 35e is provided at the rear end of the upper surface of the support plate 35b. The second lateral portion 35e is provided with the first holding portion 35f at one of opposite ends thereof that is closer to the one of the opposite sides of the machine body in the machine-body width direction (at the left end) and the second holding portion 35g at the other of the opposite ends thereof that is closer to the other of the opposite sides of the machine body in the machine-body width direction (at the right end).

The first holding portion 35f extends upward from the left end of the second lateral portion 35e and is curved obliquely upward and rearward at an intermediate portion thereof. The second holding portion 35g extends upward from the right end of the second lateral portion 35e and is curved obliquely upward and rearward at an intermediate portion thereof.

The first vertical portion 35h is a member that is inclined downward in the rearward direction and to which one of opposite end portions (which is closer to the one of opposite sides of the machine body in the machine-body width direction) (the left end portion) of the base 36 is attached. The first vertical portion 35h extends rearward from one of opposite end portions of the first lateral portion 35d that is closer to the one of the opposite sides of the machine body in the machine-body width direction (the left end portion) and then is bent downward. The first vertical portion 35h is bent at an intermediate portion thereof to extend obliquely downward and rearward and extends rearward beyond the upper end of the first holding portion 35f. The upper end of the first holding portion 35f and a lower portion of the first vertical portion 35h are joined to each other by, for example, welding or other method or material. In other words, an upper end portion of the first vertical portion 35h is connected to a left end portion of the first lateral portion 35d, and the lower portion of the first vertical portion 35h is connected to the upper end of the first holding portion 35f, so that the first vertical portion 35h is held by the first lateral portion 35d and the first holding portion 35f. When viewed from the side, the intermediate portion of the first vertical portion 35h is inclined from the upper front to the lower rear.

The second vertical portion 35i is a member that is inclined downward in the rearward direction and to which the other of the opposite end portions (which is closer to the other of the opposite sides of the machine body in the machine-body width direction (the left end portion) of the base 36 is attached. The second vertical portion 35i extends rearward from a position in the vicinity of the other of the opposite end portions that is closer to the other of the opposite sides of the machine body in the machine-body width direction (the right end portion) of the first lateral portion 35d and then is bent downward. The second vertical portion 35i is bent at an intermediate portion thereof to extend obliquely downward and rearward and extends rearward beyond the upper end of the second holding portion 35g. The upper end of the second holding portion 35g and a lower portion of the second vertical portion 35i are joined to each other by, for example, welding or other method or material. In other words, an upper end portion of the second vertical portion 35i is connected to a portion near the right end portion of the first lateral portion 35d, and the lower portion of the second vertical portion 35i is connected to the upper end of the second holding portion 35g, so that the second vertical portion 35i is held by the first lateral portion 35d and the second holding portion 35g. When viewed from the side, the intermediate portion of the second vertical portion 35i is inclined from the upper front to the lower rear.

The base 36 is a planar plate to which the condenser D1 and the electric fan F1 are attached. The base 36 is attached to an inclined portion of the first vertical portion 35h and an inclined portion of the second vertical portion 35i such that the plate surfaces of the base 36 are each inclined downward in the rearward direction.

More specifically, a left edge portion of the base 36 is provided with left attachment portions 36a1 to attach the base 36 to the first vertical portion 35h. The two left attachment portions 36a1 are arranged in the vertical direction. The left attachment portions 36a1 have through holes for bolts B1 to pass through. The left attachment portions 36a1 are attached to the first vertical portion 35h with the bolts B1, so that the base 36 is fixed to the first vertical portion 35h.

The left attachment portions 36a1 have two holes for attachment of left attachment portions D1a1 provided at the left edge of the condenser D1. In the present embodiment, a sheet metal member (not illustrated) is bolted to each of the left attachment portions D1a1 using the holes 36a3 in the left attachment portions D1a1 of the condenser D1, and an elastic member made of rubber or the like is attached to this sheet metal member. The left attachment portions D1*a*1 of the condenser D1 are fixed to the left attachment portions 36*a*1 of the base 36 by bolting such that the elastic member is sandwiched between the sheet metal member and the left attachment portions 36*a*1.

A right edge portion of the base 36 is provided with right attachment portions 36*a*2 for to attach the base 36 to the second vertical portion 35*i*. The two right attachment portions 36*a*2 are arranged in the vertical direction. The right attachment portions 36*a*2 have through holes for bolts B1 to pass through. The right attachment portions 36*a*2 are attached to the second vertical portion 35*i* with the bolts B1, so that the base 36 is fixed to the second vertical portion 35*i*.

The right attachment portions 36*a*2 have two holes 36*c*4 for attachment of right attachment portions D1*a*2 provided at the right edge of the condenser D1. In the present embodiment, a sheet metal member (not illustrated) is bolted to each of the right attachment portions D1*a*2 using the holes 36*a*4 in the right attachment portions D1*a*2 of the condenser D1, and an elastic member made of rubber or the like is attached to this sheet metal member. The right attachment portions D1*a*2 of the condenser D1 are fixed to the right attachment portions 36*a*2 of the base 36 by bolting such that the elastic member is sandwiched between the sheet metal member and the right attachment portions 36*a*2.

As illustrated in FIG. 11B, the electric fan F1 is attached to the reverse side (lower front side) of the base 36. The electric fan F1 is attached such that the electric fan F1 matches a through hole 36*a*5 at the center of the base 36. In other words, the electric fan F1 to cool the condenser D1 is provided on or above the hood 29 such that the electric fan F1 faces the condenser D1, and the bracket 34 supports the condenser D1 and the electric fan F1.

As described above, the condenser D1 is attached to the obverse side (upper rear side) of the base 36, and the electric fan F1 is attached to the reverse side (lower front side) of the base 36, so that the condenser D1 and the electric fan F1 are mounted such that they are inclined downward in the rearward direction. In other words, the condenser D1 is provided above the hood 29 such that the condenser D1 faces a lower portion of the rear surface of the rear panel 23 of the cabin 5. The condenser D1 is positioned such that an upper surface thereof is inclined downward in the rearward direction. Note that, in the present embodiment, although the condenser D1 is attached to the obverse side (upper rear side) of the base 36, and the electric fan F1 is attached to the reverse side (lower front side) of the base 36, the present invention is not limited as such. For example, the electric fan F1 may be attached to the obverse side (upper rear side) of the base 36 and the condenser D1 may be attached to the reverse side (lower front side) of the base 36. A fan that is driven by a driving force of an engine, a fan that is driven by hydraulic pressure, or the like may be provided instead of the electric fan F1.

As illustrated in FIGS. 10A to 11B and the like, the receiver R1 is provided such that the receiver R1 is closer to the other of the opposite sides of the machine body than the condenser D1 is in the machine-body width direction (on the right side of the condenser D1) in an accommodating member 44. The receiver R1 stores the refrigerant that has passed through the condenser D1. The receiver R1 has a cylindrical shape, and in the present embodiment, the receiver R1 is positioned on the right side of the condenser D1 and provided such that the receiver R1 extends in the vertical direction. The receiver R1 is attached in an upright position to an intermediate portion of the second vertical portion 35*i* via a stay 50. The condenser D1 and the receiver R1 are connected to each other by AC hose(s) 40. The receiver R1 is located behind and at a distance from the cabin 5 to leave a space where the AC hose(s) 40 is/are guided in a curved manner.

As illustrated in FIG. 13, the hood 29 has a hole portion 39 to allow the air-conditioning hose(s) 40 and harness(es) 41 to be guided therethrough. The refrigerant for the air conditioner flows through the air-conditioning hose(s) 40. The harness(es) 41 is connected to the electric fan F1. More specifically, the hood center 29*a* has the hole portion 39 that has a quadrangular shape and that allows communication between the inside and the outside of the engine compartment 21. In the present embodiment, in the hood center 29*a*, the hole portion 39 is provided at a position corresponding to the cutout portion 35*b*3 of the support plate 35*b* which is provided above the hood center 29*a*. In other words, the hole portion 39 is located on the left side of the hole portions 38 at the center of the hood center 29*a*. The hole portion 39 is provided between the rear end of the hood center 29*a* and the cabin 5 (rear panel 23).

The hole portion 39 is connected to the compressor in the hood 29 and allows the AC hose(s) 40, through which the refrigerant flows, and wire(s) (harness(es)) 41 to control the air conditioner to pass therethrough.

Figure 15:
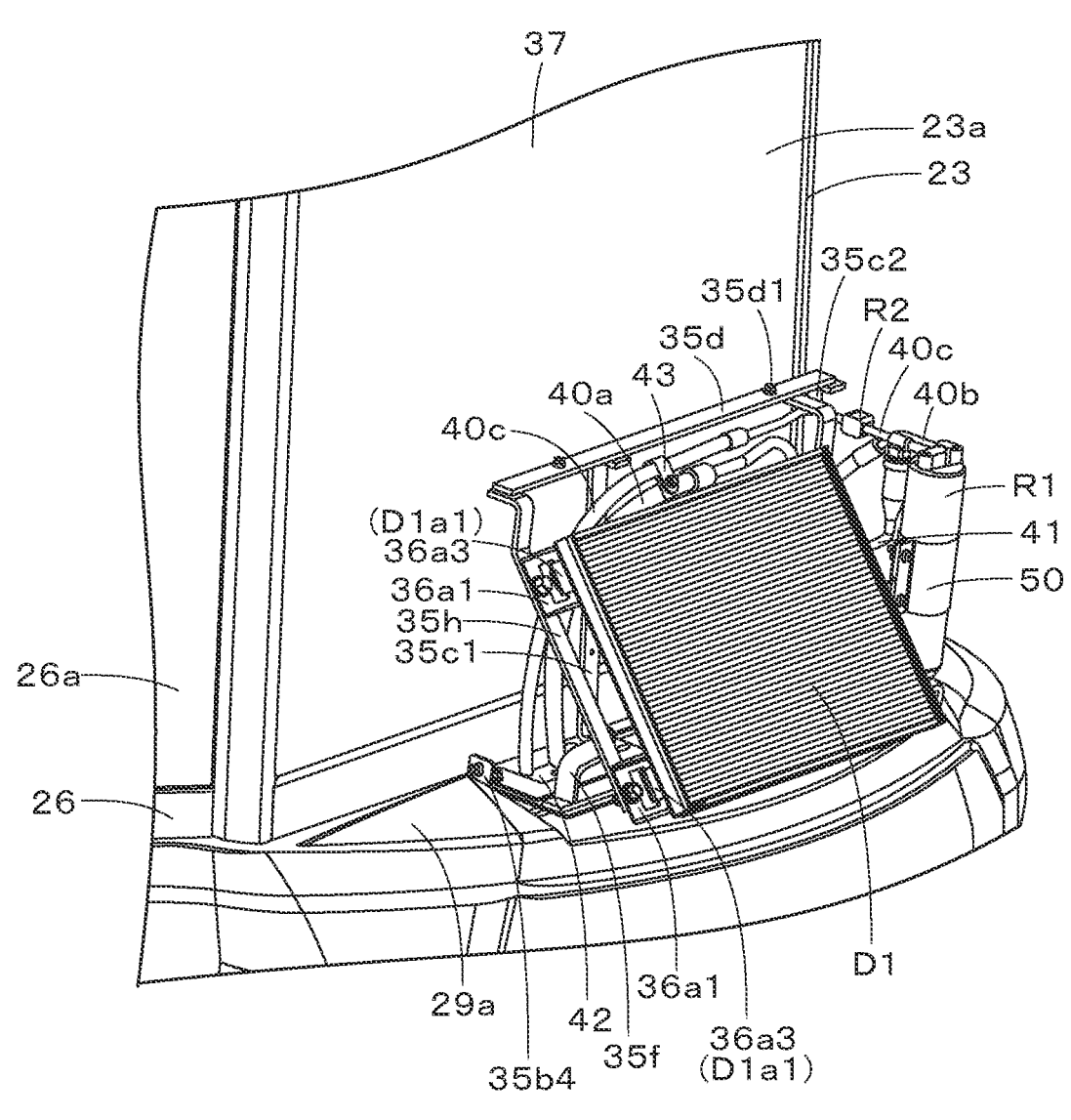
FIG. 15 is a rear perspective view schematically illustrating a state where the condenser is attached to the bracket.

As illustrated in FIG. 13 and the like, the AC hose(s) 40 and the wire(s) 41 are guided such that they extend from the hole portion 39 in the upward direction. The AC hose(s) 40 and the wire(s) 41 are guided such that they extend in the rightward direction along the first lateral portion 35*d*. The AC hose(s) 40 is/are connected to the condenser D1, the receiver R1, and the sight glass R2. As illustrated in FIG. 15, the AC hose(s) 40 is/are guided along the first lateral portion 35*d* of the bracket 34 by a guide member 43. The guide member 43 is a hook-shaped member that has a J-shaped cross section and is attached to an upper portion of the condenser D1.

As illustrated in FIGS. 13 to 15 and the like, an AC hose 40*a* extends in the upward direction from the hole portion 39 and is bent in the rightward direction. The AC hose 40*a* reaches the right upper edge of the condenser D1 and is connected to the condenser D1. An AC hose 40*b* is connected to the right lower edge of the condenser D1, and the AC hose 40*b* is guided in such a manner as to be curved in the upward direction and connected to the upper end of the receiver R1. Another AC hose (an AC hose 40*c*) is connected to the receiver R1, and the AC hose 40*c* is provided in such a manner as to extend linearly forward. In addition, the AC hose 40*c* is provided with the sight glass R2. The AC hose 40*c* passes through the sight glass R2, is bent in the leftward direction, is guided along the first lateral portion 35*d*, is bent downward, and inserted into the hole portion 39. Note that the sight glass R2 is positioned at approximately the same height as the upper end of the receiver R1 and is provided so as to be visible through a right second opening 45*b* (second air inlet 46*b*). In other words, the sight glass R2 to check the state of an air-conditioning gas is positioned such that the sight glass R2 is seen from the outside of the accommodating member 44 through at least one of air inlets 46.

Note that a seal member 42 including an elastic member made of rubber or the like is received in the hole portion 39 which has a quadrangular shape. The seal member 42 is mounted such that it is pressed down from above by attaching a plate-shaped member to the support member 35 and prevent or reduce entry of rainwater, dust, and the like into the engine compartment 21 through the hole portion 39.

For convenience of description, the configuration of the condenser D1 (the condenser D1, the bracket 34, the receiver R1, and so forth) assembled as illustrated in FIG. 15 will be described below as a condenser D1 assembly. As illustrated in FIG. 15, the backhoe 1 appears to carry the condenser D1 assembly.

As illustrated in FIGS. 1 to 16 and the like, the condenser D1 assembly is covered with an accommodating member 44 and is mounted on the hood 29.

In the present embodiment, the accommodating member 44 is in a triangular shape that is inclined rearward when viewed from the side. An inclined rear surface (oblique side surface) of the accommodating member 44 corresponds to the upper surface (the surface facing rearward (the obverse side)) of the condenser D1. The accommodating member 44 may be made of a resin or the like or may be made of a sheet metal.

Figure 12:
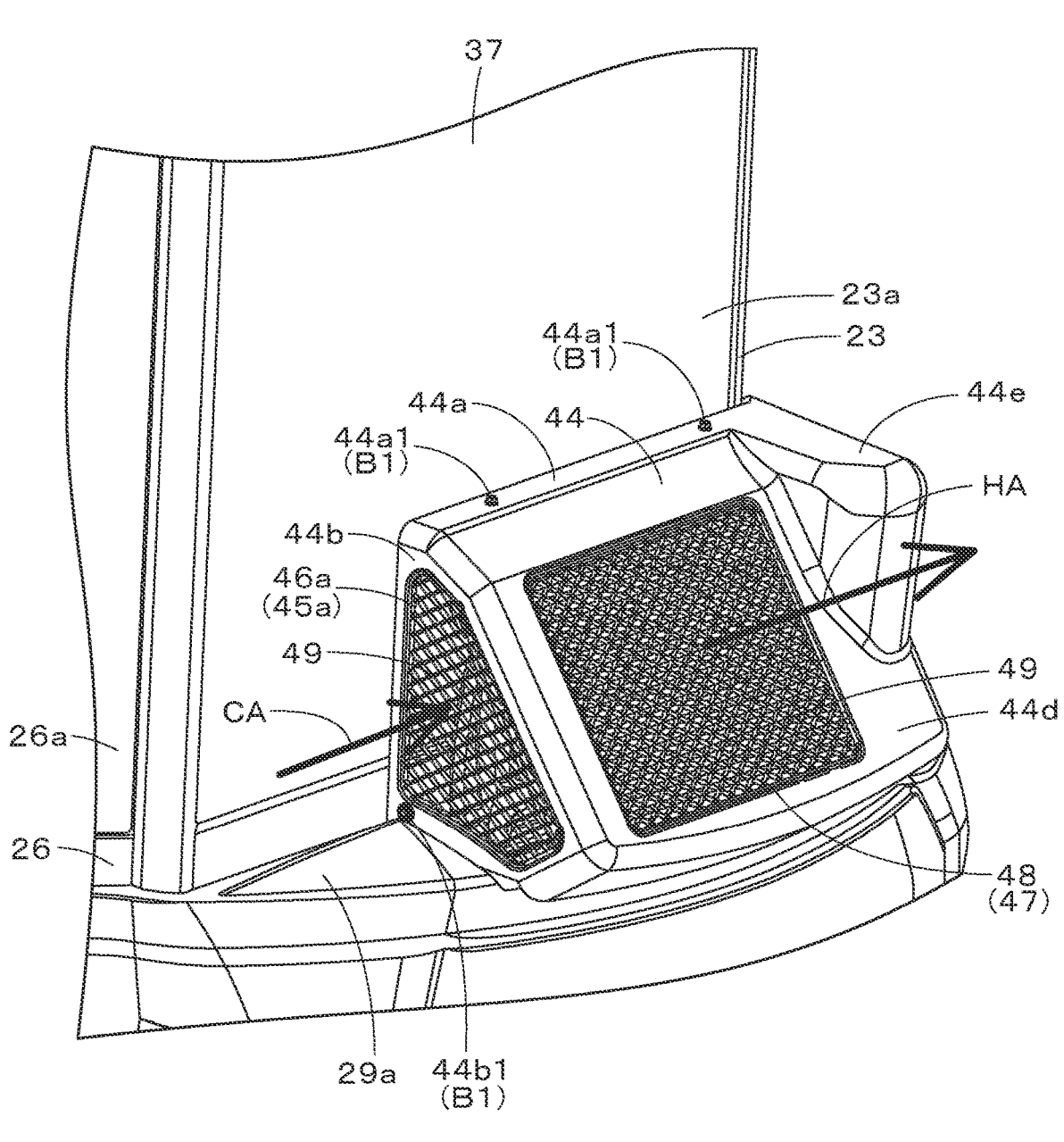
FIG. 12 is a rear perspective view schematically illustrating an overview of the condenser that is obliquely mounted on a hood behind a cabin.

As illustrated in FIG. 12 and the like, the accommodating member 44 has a top wall 44a, a left side wall 44b, a right side wall 44c, and an inclined wall 44d. The top wall 44a defines an upper portion of the accommodating member 44. The left side wall 44b defines a left side portion of the accommodating member 44. The right side wall 44c defines a right side portion of the accommodating member 44. The inclined wall 44d defines a rear inclined portion of the accommodating member 44. The top wall 44a, the left side wall 44b, the right side wall 44c, and the inclined wall 44d define a space in which the condenser D1 the receiver R1, and so forth are accommodated.

The inclined wall 44d is an inclined portion that corresponds to the upper surface of the condenser D1. The inclined wall 44d has a third opening 47 that corresponds to the upper surface of the condenser D1.

As illustrated in FIG. 12 and the like, the accommodating member 44 includes a receiver accommodating portion 44e. The receiver accommodating portion 44e is a cylindrical space larger than the receiver R1, and in the present embodiment, the receiver accommodating portion 44e is positioned on the right side of the inclined wall 44d (third opening 47).

Figure 10A:
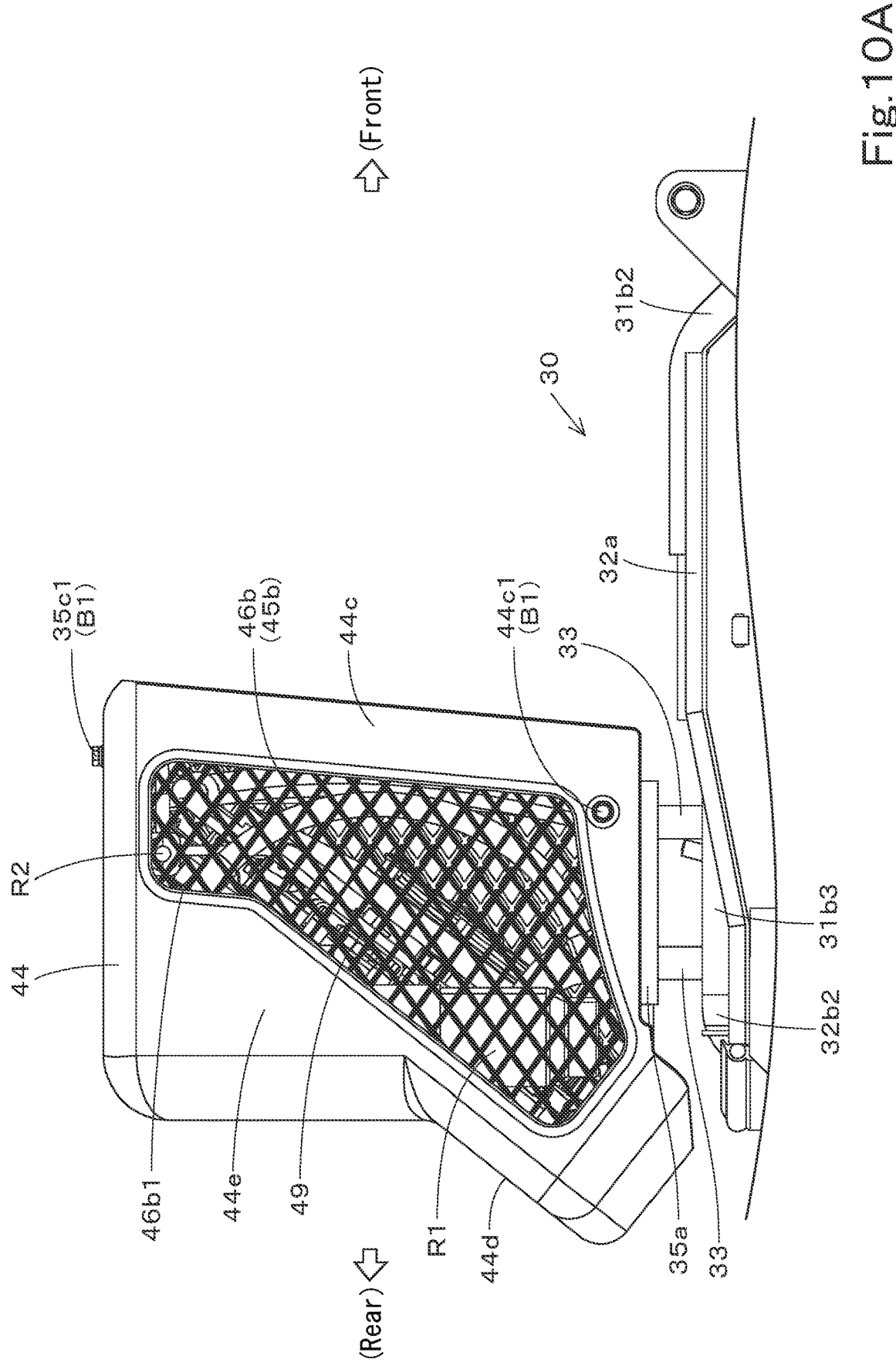
FIG. 10A is a side view schematically illustrating an overview of an accommodating member that covers the condenser.
Figure 10B:
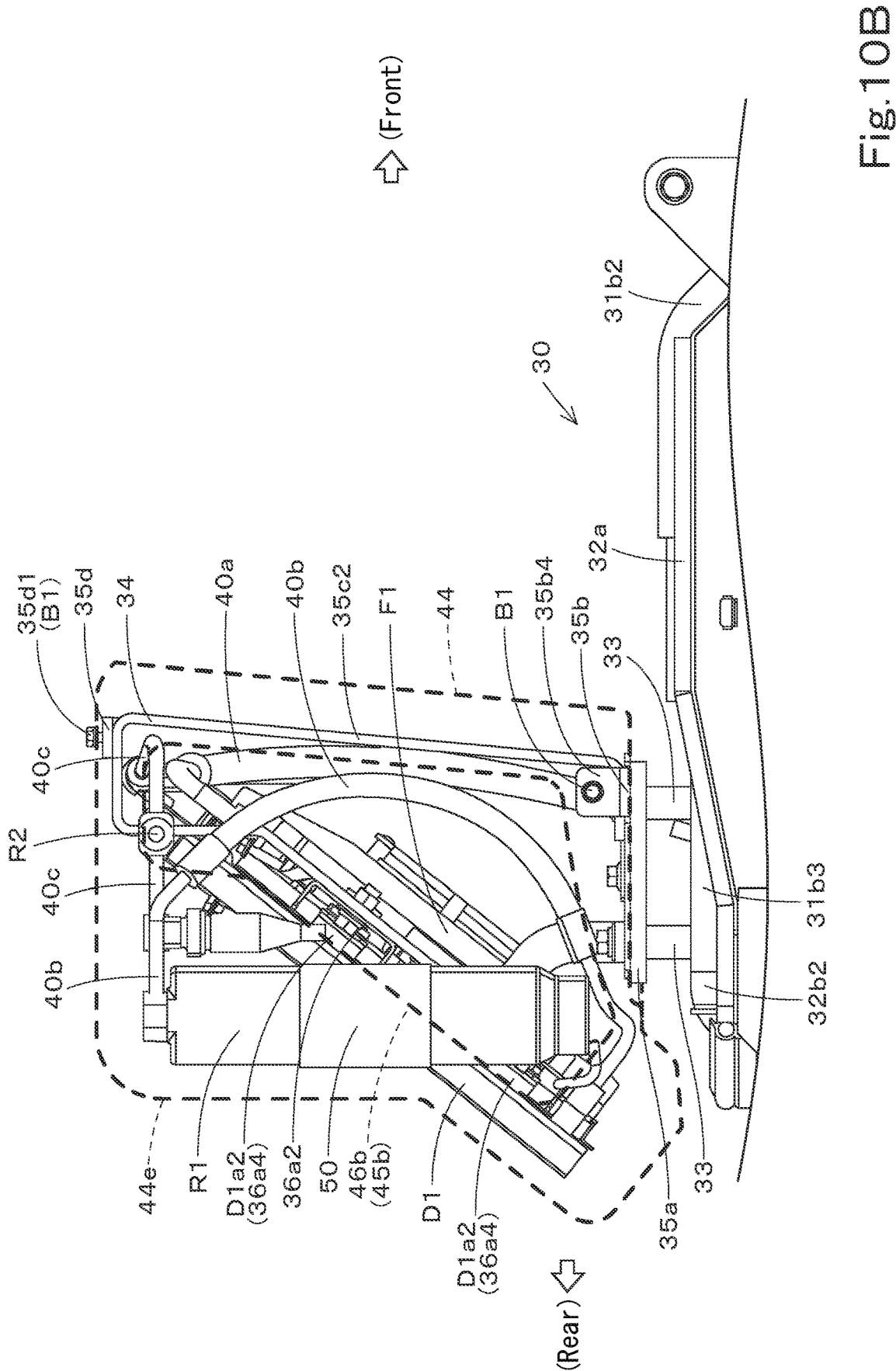
FIG. 10B is a side view schematically illustrating an overview including the condenser, a receiver, an electric fan, and so forth.

As illustrated in FIG. 10B the accommodating member 44 is attached to the bracket 34. The top wall 44a is provided with third attachment portions 44a1. The third attachment portions 44a1 are portions (holes) for attachment of the accommodating member 44 to the first lateral portion 35d. More specifically, the accommodating member 44 is attached to the first lateral portion 35d by second attachment portions 35d1 which are provided at the first lateral portion 35d, the third attachment portions 44a1, and the bolts B1. The second attachment portions 35d1 are holes that are spaced apart from each other in the machine-body width direction and extend through the first lateral portion 35d in the vertical direction. The top wall 44a is attached to the first lateral portion 35d by inserting the bolts B1 into the third attachment portions 44a1 and the second attachment portions 35d1.

The left side wall 44b is provided with a fourth attachment portion 44b1. The right side wall 44c is provided with a fifth attachment portion 44c1. The fourth attachment portion 44b1 and the fifth attachment portion 44c1 are portions (holes) for attachment of the accommodating member 44 to the support plate 35b. More specifically, the accommodating member 44 is attached to the support plate 35b by first attachment portions 35b4 which are formed on the support plate 35b, the fourth attachment portion 44b1, the fifth attachment portion 44c1, and the bolts B1. The first attachment portions 35b4 are each formed on a front portion of the support plate 35b. More specifically, the first attachment portions 35b4 are provided on the front side of the ends (the left end and the right end) of the support plate 35b in the machine-body width direction. The first attachment portions 35b4 are obtained by bending the end portions of the support plate 35b in the machine-body width direction. The left side wall 44b and the right side wall 44c are attached to the support plate 35b by inserting one of the bolts B1 into one of the first attachment portions 35b4 and the fourth attachment portion 44b1 and inserting another one of the bolts B1 into the other first attachment portion 35b4 and the fifth attachment portion 44c1.

As illustrated in FIGS. 10A to 12 and the like, the accommodating member 44 has an opening 45a (first air inlet 46a), the opening 45b (second air inlet 46b), and the opening 47 (air outlet 48). The opening 45a (the first air inlet 46a) allows communication between the inside and the outside of the accommodating member 44. More specifically, the accommodating member 44 has the air inlets 46 and the air outlet 48. The air inlets 46 are provided in the left and right side surfaces of the accommodating member 44, and the air to cool the condenser D1 is drawn in by the electric fan F1 through the air inlets 46. The air outlet 48 is provided in the rear surface of the accommodating member 44 that is inclined downward in the rearward direction. The air that has been blown out from the electric fan F1 and that has been used to cool the condenser D1 is discharged through the air outlet 48 diagonally upward and rearward. The rear surface of the accommodating member 44 that has the air outlet 48 is inclined downward in the rearward direction, and the condenser D1 is inclined downward in the rearward direction, so that the condenser D1 faces the air outlet 48. The electric fan F1 is provided at the front side of the condenser D1 and is configured to blow the air diagonally upward and rearward toward the condenser D1.

The air inlets 46a and 46b are openings through which the electric fan F1 draws in the cooling air from the machine-body width direction and are provided on the sides of the accommodating member 44.

More specifically, the left side wall 44b of the accommodating member 44 has the first opening 45a facing leftward. The first opening 45a is the first air inlet 46a. The first air inlet 46a is n a substantially triangular shape and provided such that its oblique side extends along the inclined wall 44d. The right side wall 44c of the accommodating member 44 has the second opening 45b facing rightward. The second opening 45b is the second air inlet 46b. The second air inlet 46b is in a substantially triangular shape and provided such that its oblique side extends along the inclined wall 44d.

The second air inlet 46b includes a projecting upper portion. The second air inlet 46b extends over the receiver accommodating portion 44e. In other words, the air inlets 46a and 46b to take in cooling air CA from the outside are provided on the left and right sides of the condenser D1. A dustproof mesh member 49 is attached to each of the air inlets 46a and 46b.

More specifically, as illustrated in FIG. 10B, each of the air inlets 46a and 46b is shaped to substantially match the external shape of the bracket 34. More specifically, the inclinations of the oblique sides of the left and right air inlets 46a and 46b match the inclinations of the first vertical portion 35h and the second vertical portion 35i. The air inlets 46a and 46b each of which has a substantially triangular shape communicate with the space on the rear side of the condenser D1. In other words, the oblique side of the air inlets 46 is positioned forward and downward of the condenser D1. The cooling air CA flows into the space on the rear side of the condenser D1 from the outside through the left and right air inlets 46*a* and 46*b*. The cooling air CA is taken into the accommodating member 44 by the electric fan F1 through the left and right air inlets 46*a* and 46*b* and is sent to the condenser D1 as the cooling air CA.

The positional relationship between the receiver R1 and the right second air inlet 46*b* will now be described. The receiver R1 is provided on the right side of the condenser D1 and positioned behind the cabins 5 with a space therebetween. Thus, the receiver R1 is positioned close to the rear end of the second air inlet 46*b*. In other words, the receiver R1 is positioned close to a portion of the second air inlet 46*b* that is short in the vertical direction, and thus, the receiver R1 does not block the opening of the second air inlet 46*b*. Note that the shape and the area of each of the left and right air inlets 46*a* and 46*b* are not limited to those mentioned as examples. For example, the left and right air inlets 46*a* and 46*b* may each have a quadrangular shape. In addition, the area of each of the left and right air inlets 46*a* and 46*b* may be set by taking the cooling capacity of the condenser D1 into consideration.

The inclined wall 44*d* has the rear third opening 47 facing diagonally upward and rearward. The rear third opening 47 is the air outlet 48. The air outlet 48 is an opening for discharging an air HA that has cooled the condenser D1. The air outlet 48 extends from the upper end to the lower end of the inclined wall 44*d*. The air outlet 48 is provided so as to correspond to the upper surface of the condenser D1.

More specifically, the inclined rear surface of the accommodating member 44 has the rear third opening 47 facing rearward. The rear third opening 47 is the air outlet 48 for discharging the air HA that has undergone heat exchange in the condenser D1. In other words, the air outlet 48 through which the air HA that has undergone heat exchange in the condenser D1 is discharged is provided behind the condenser D1 so as to face obliquely upward. The air outlet 48 is provided so as to face the upper surface of the condenser D1. Another dustproof mesh member 49 is attached to the air outlet 48.

The air HA that has been sent to the condenser D1 by the electric fan F1, that has passed through the condenser D1, and that has undergone heat exchange is discharged rearward and obliquely upward from the air outlet 48.

As illustrated in FIGS. 10A and 10B and the like, the AC hose 40 is provided with the sight glass R2 to check the state of the air-conditioning gas. As illustrated in FIGS. 10A and 10B and the like, when viewed from the side, the sight glass R2 is provided such that it is seen through a protruding portion 46*b*1 of the right second air inlet 46*b*.

Note that, in the present embodiment, although the sight glass R2 is provided such that it is seen through the right second opening 45*b* (second air inlet 46*b*), the position of the sight glass R2 is not limited to the position that has mentioned above as an example as long as the sight glass R2 can be checked from the outside. For example, the receiver R1 may be provided on the left side of the condenser D1, and the sight glass R2 may be provided such that it is seen through the left first air inlet 46*a*.

As has been described, a working machine 1 according to one or more embodiments includes a machine body 4, a cabin 5 which is provided on the machine body 4 and in which an operator's seat 27 where an operator O sits is provided, a hood 29 provided behind the cabin 5, and a condenser D1 for an air conditioner to adjust a temperature inside the cabin 5, wherein the condenser D1 is provided above the hood 29 such that the condenser D1 faces a lower portion of a rear surface of a rear panel 23 of the cabin 5.

With the above-described configuration, since the condenser D1 of the air conditioner is located outside the engine compartment 21 and the cabin 5, it is possible to prevent or reduce the thermal effect of the condenser D1 of the air conditioner on the working machine 1 without deteriorating the comfort of the cabin 5. Furthermore, compared with the case where the condenser D1 is provided in the engine compartment 21, it is possible to improve the maintainability of the condenser D1 and elements provided in the engine compartment 21.

The condenser D1 (or an accommodating member 44 housing the condenser D1) may be positioned such that an upper surface (rear surface) thereof is inclined downward in a rearward direction.

With this, compared with the case where the condenser D1 is vertically installed, the installation space of the condenser D1 in the vertical direction can be reduced. For example, a rear window 23*a* of the rear panel 23 may be a window made of a see-through material, and an upper end of the condenser D1 may be lower than a midpoint between upper and lower ends of the rear window 23*a* and lower than an upper end of a backrest portion of the operator's seat 27. With this, compared with the case where the condenser D1 is vertically installed, it is possible to prevent or reduce a decrease in the field of rear view of the operator O in the operator's seat 27 through the rear window 23*a*. In the case where the rear window 23*a* of the cabin 5 functions as an emergency exit 37, it is possible to ensure an area that enables the operator O to escape through the emergency exit 37 even with the condenser D1 kept installed. Furthermore, since exhaust heat from the condenser D1 can be discharged diagonally rearward and upward, the air discharged from the condenser D1 can be prevented from directly hitting workers who are working in the vicinity of the backhoe 1, pedestrians, and others. Furthermore, it is possible to reduce propagation of noise generated by the electric fan F1 and the like rearward from the working machine 1.

Compared with the case where the condenser D1 is horizontally installed, the installation space of the condenser D1 in the front-rear direction can be reduced. With this, the condenser D1 may be positioned inward of an outer edge of the machine body 4 (for example, an outer edge of a weight 8) in plan view, and may be included within the turning radius of the working machine 1.

In the present embodiment, the rear edge of the machine body 4 (weight 8) is in the form of an arc centered on a turning axis X1, and the condenser D1 is provided equally on left and right sides of a centerline in the machine-body width direction in plan view, the centerline Y1 passing through the turning axis X1 of the working machine 1 and extending in the front-rear direction in plan view. With this, in plan view, the condenser D1 can be positioned inward of the outer edge of the machine body 4 (e.g., outer edge of the weight 8) and can be appropriately positioned within the turning radius of the working machine 1.

The position of a right side wall 44*c* of the accommodating member 44 (condenser D1) and the position of a right side wall (side panel 25) of the cabin 5 may be substantially the same in the machine-body width direction. This makes it possible to ensure the field of rear view of the operator O using a right side mirror 5*a* provided at the cabin 5.

The working machine 1 may further include a support frame 30 in the hood 29 to support the hood 29, a bracket 34 to support the condenser D1, and a bracket support member (boss member 33) fixed to the support frame 30 and extending through the hood 29 to support the bracket 34 above the hood 29.

With the above-described configuration, the condenser D1 can be appropriately supported above the hood 29.

The hood 29 may have a hole portion 39 to allow at least one air-conditioning (AC) hose 40 to be guided therethrough, the at least one air-conditioning hose being at least one hose to allow a refrigerant for the air conditioner to flow therethrough. With this, the AC hose(s) 40 can be appropriately guided between the inside of the engine compartment 21 and the outside of the engine compartment 21.

The working machine 1 may further include an electric fan F1 to cool the condenser D1, the fan F1 being provided on or above the hood 29 such that the fan F1 faces the condenser D1. This makes it possible to efficiently cool the condenser D1.

The working machine 1 may further include an electric fan F1 to cool the condenser D1 the fan F1 being provided on or above the hood 29 such that the fan F1 faces the condenser D1, and the bracket 34 supports the condenser D1 and the fan F1. With this, the condenser D1 and the electric fan F1 can be appropriately supported above the hood 29.

The hood may have a hole portion 39 to allow at least one air-conditioning (AC) hose and at least one harness 41 to be guided therethrough, the at least one air-conditioning hose 40 being at least one hose to allow a refrigerant for the air conditioner to flow therethrough, the at least one harness 41 being connected to the electric fan F1. With this, the AC hose 40 and the harness 41 can be appropriately guided between the inside of the engine compartment 21 and the outside of the engine compartment 21.

A working machine 1 includes a machine body 4, a cabin 5 which is provided on the machine body 4 and in which an operator's seat 27 where an operator O sits is provided, a hood 29 provided behind the cabin 5, a condenser D1 for an air conditioner to adjust a temperature inside the cabin 5, a fan (electric fan F1) to generate an airflow to cool the condenser D1, and an accommodating member 44 to contain the condenser D1 and the fan (electric fan F1), wherein the accommodating member 44 has air inlets 46 which allow air for cooling the condenser D1 to enter the accommodating member 44, the air inlets 46 being provided in left and right side surfaces of the accommodating member 44, and an air outlet 48 which allows air that has been used to cool the condenser D1 to be discharged diagonally upward and rearward, the air outlet 48 being provided in a rear surface of the accommodating member 44, the rear surface being inclined downward in a rearward direction. With this, exhaust heat from the condenser D1 can be discharged diagonally rearward and upward.

The rear surface of the accommodating member 44 that has the air outlet 48 may be inclined downward in the rearward direction. The condenser D1 may be inclined downward in the rearward direction and faces the air outlet 48. The fan (electric fan F1) may be provided at a front side of the condenser D1 and is configured to blow air diagonally upward and rearward toward the condenser D1. With this, the air discharged from the condenser D1 can be prevented from directly hitting workers who are working in the vicinity of the backhoe 1, pedestrians, and others.

The working machine 1 may further include a sight glass R2 used to check a state of an air-conditioning gas, the sight glass R2 being positioned such that the sight glass R2 is seen from an outside of the accommodating member 44 through at least one of the air inlets 46.

With the above-described configuration, the working machine 1 makes it possible to easily check the state of the sight glass R2.

The working machine 1 may further include a support frame 30 in the hood 29 to support the hood 29, and a bracket 34 to support the condenser D1 and the fan (electric fan F1) above the hood 29. The support frame 30 may include a bracket support member (boss member 33) provided at an upper portion of the support frame 30 and extending through the hood 29 to support the bracket 34 above the hood 29. With this, the condenser D1 can be appropriately supported above the hood 29.

A receiver R1 to store a refrigerant for the air conditioner may be provided on one side of the condenser D1 in the accommodating member 44. This achieves a compact layout.

A working machine 1 includes a machine body 4, a cabin 5 which is provided on the machine body 4 and in which an operator's seat 27 where an operator O sits is provided, a condenser D1 for an air conditioner to adjust a temperature inside the cabin 5, a support frame 30 in a hood 29 behind the cabin 5 to support the hood 29, a bracket 34 to support the condenser D1 above the hood 29, and a bracket support member (boss member 33) fixed to the support frame 30 and extending through the hood 29 to support the bracket 34 above the hood 29. With this, since the condenser D1 is provided outside the engine compartment 21 and the cabin 5, it is possible to prevent or reduce a thermal effect of the condenser D1 on the working machine 1 without deteriorating the comfort of the cabin 5. Furthermore, compared with the case where the condenser D1 is provided in the engine compartment 21, it is possible to improve the maintainability of the condenser D1 and elements provided in the engine compartment 21.

The hood 29 may have a hole portion 38 to allow the bracket support member (boss member 33) to extend therethrough. With this, it is possible to arrange the upper surface of the hood 29 and the upper surface of the bracket support member (boss member 33) such that they are substantially flush with each other.

The working machine 1 may further include a fan (electric fan F1) to cool the condenser D1. The bracket 34 may support the electric fan F1. With this, the condenser D1 and the electric fan F1 can be appropriately supported above the hood 29.

The working machine 1 may further include a receiver R1 to store a refrigerant for the air conditioner. The bracket 34 may support the receiver R1. With this, the receiver R1 can be appropriately supported above the hood 29.

The bracket support member may be a boss member 33 fixed to an upper surface of the support frame 30. With this, the bracket 34 can be appropriately supported above the hood 29.

While example embodiments of the present invention have been described above, it is to be understood that variations and modifications will be apparent to those skilled in the art without departing from the scope and spirit of the present invention. The scope of the present invention, therefore, is to be determined solely by the following claims. Although the present invention has been described by taking a backhoe 1 as an example, the present invention is not limited to the backhoe 1 and is also applicable to other construction machines, agricultural machines, and the like.

What is claimed is:
1. A working machine comprising:
a lower traveling body; and
an upper turnable body mounted on the lower traveling body in such a manner as to be turnable;

the upper turnable body including:

a machine body;

a cabin which is provided on the machine body and in which an operator's seat where an operator sits is provided;

a hood provided behind the cabin;

a condenser for an air conditioner to adjust a temperature inside the cabin;

a support frame in the hood to support the hood;

a bracket to support the condenser; and a bracket support member fixed to the support frame and extending through the hood to support the bracket above the hood; wherein the condenser is provided above the hood such that the condenser faces a lower portion of a rear surface of a rear panel of the cabin, and is positioned such that an upper surface thereof is inclined downward in a rearward direction.

2. The working machine according to claim 1, wherein the rear panel is provided with a rear window made of a see-through material; and an upper end of the condenser is lower than a midpoint between upper and lower ends of the rear window and lower than an upper end of a backrest portion of the operator's seat.

3. The working machine according to claim 1, wherein the condenser is positioned inward of an outer edge of the machine body in plan view.

4. The working machine according to claim 1, wherein the upper turnable body includes at least one air-conditioning hose to allow a refrigerant for the air conditioner to flow therethrough; and the hood has a hole portion to allow the at least one air-conditioning hose to be guided therethrough.

5. The working machine according to claim 1, further comprising:

a fan to cool the condenser, the fan being provided on or above the hood such that the fan faces the condenser.

6. The working machine according to claim 1, further comprising:

a fan to cool the condenser, the fan being provided on or above the hood such that the fan faces the condenser; wherein the bracket supports the condenser and the fan.

7. The working machine according to claim 5, wherein the fan is an electric fan;

the upper turnable body includes:

at least one air-conditioning hose to allow a refrigerant for the air conditioner to flow therethrough; and at least one harness connected to the electric fan; and the hood has a hole portion to allow the at least one air-conditioning hose and the at least one harness to be guided therethrough.

8. The working machine according to claim 5, further comprising:

an accommodating member to contain the condenser and the fan; wherein the accommodating member has air inlets which allow air for cooling the condenser to enter the accommodating member, the air inlets being provided in left and right side surfaces of the accommodating member, and an air outlet which allows air that has been used to cool the condenser to be discharged diagonally upward and rearward, the air outlet being provided in a rear surface of the accommodating member, the rear surface being inclined downward in a rearward direction.

9. The working machine according to claim 8, wherein the rear surface of the accommodating member that has the air outlet is inclined downward in the rearward direction;

the condenser is inclined downward in the rearward direction and faces the air outlet; and the fan is provided at a front side of the condenser and is configured to blow air diagonally upward and rearward toward the condenser.

10. A working machine comprising:

a lower traveling body; and an upper turnable body mounted on the lower traveling body in such a manner as to be turnable;

the upper turnable body including:

a machine body;

a cabin which is provided on the machine body and in which an operator's seat where an operator sits is provided;

a hood provided behind the cabin;

a condenser for an air conditioner to adjust a temperature inside the cabin;

a fan to cool the condenser, the fan being provided on or above the hood such that the fan faces the condenser;

an accommodating member to contain the condenser and the fan;

the condenser being provided above the hood such that the condenser faces a lower portion of a rear surface of a rear panel of the cabin, and being positioned such that an upper surface thereof is inclined downward in a rearward direction;

the accommodating member having air inlets which allow air for cooling the condenser to enter the accommodating member, the air inlets being provided in left and right side surfaces of the accommodating member, and an air outlet which allows air that has been used to cool the condenser to be discharged diagonally upward and rearward, the air outlet being provided in a rear surface of the accommodating member, the rear surface being inclined downward in the rearward direction; and a sight glass used to check a state of an air-conditioning gas used in the air conditioner, the sight glass being positioned such that the sight glass is seen from an outside of the accommodating member through at least one of the air inlets; wherein the rear surface of the accommodating member that has the air outlet is inclined downward in the rearward direction;

the condenser is inclined downward in the rearward direction and faces the air outlet; and the fan is provided at a front side of the condenser and is configured to blow air diagonally upward and rearward toward the condenser.

11. A working machine comprising:

a lower traveling body; and an upper turnable body mounted on the lower traveling body in such a manner as to be turnable;

the upper turnable body including:

a machine body:

a cabin which is provided on the machine body and in which an operator's seat where an operator sits is provided;

a hood provided behind the cabin;

a condenser for an air conditioner to adjust a temperature inside the cabin;

a fan to cool the condenser, the fan being provided on or above the hood such that the fan faces the condenser;

an accommodating member to contain the condenser and the fan;

a support frame in the hood to support the hood; and a bracket to support the condenser and the fan above the hood; wherein the condenser is provided above the hood such that the condenser faces a lower portion of a rear surface of a rear panel of the cabin, and is positioned such that an upper surface thereof is inclined downward in a rearward direction;

the accommodating member has air inlets which allow air for cooling the condenser to enter the accommodating member, the air inlets being provided in left and right side surfaces of the accommodating member, and an air outlet which allows air that has been used to cool the condenser to be discharged diagonally upward and rearward, the air outlet being provided in a rear surface of the accommodating member, the rear surface being inclined downward in a rearward direction; and the support frame includes a bracket support member provided at an upper portion of the support frame and extending through the hood to support the bracket above the hood.

12. The working machine according to claim 8, wherein a receiver to store a refrigerant for the air conditioner is provided on one side of the condenser in the accommodating member.

13. The working machine according to claim 8, wherein the rear panel is provided with a rear window made of a see-through material; and an upper end of the condenser is lower than a midpoint between upper and lower ends of the rear window and lower than an upper end of a backrest portion of the operator's seat.

14. The working machine according to claim 8, wherein the condenser is positioned inward of an outer edge of the machine body in plan view.

15. The working machine according to claim 1, wherein the hood has a hole portion to allow the bracket support member to extend therethrough.

16. The working machine according to claim 1, further comprising:

a receiver to store a refrigerant for the air conditioner; wherein the bracket supports the receiver.

17. The working machine according to claim 1, wherein the bracket support member is a boss member fixed to an upper surface of the support frame.

18. The working machine according to claim 1, wherein the rear panel is provided with a rear window made of a see-through material; and an upper end of the condenser is lower than a midpoint between upper and lower ends of the rear window and lower than an upper end of a backrest portion of the operator's seat.

* * * * *